US009925514B2

(12) United States Patent
Coe et al.

(10) Patent No.: US 9,925,514 B2
(45) Date of Patent: *Mar. 27, 2018

(54) MODIFIED CHABAZITE ADSORBENT COMPOSITIONS, METHODS OF MAKING AND USING THEM

(71) Applicant: Air Products and Chemicals, Inc., Allentown, PA (US)

(72) Inventors: Charles Gardner Coe, Macungie, PA (US); Christopher Robert Bongo, Zionsville, PA (US); Geoffrey John Ochs, Lake Hopatcong, NJ (US); Marissa Ann Bonanno, Stony Point, NY (US); Garret Chi-Ho Lau, Emmaus, PA (US); William Jack Casteel, Jr., Fountain Hill, PA (US); Qiao Zhao, Macungie, PA (US); Roger Dean Whitley, Allentown, PA (US); Erin Marie Sorensen, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/049,610

(22) Filed: Feb. 22, 2016

(65) Prior Publication Data

US 2017/0239640 A1    Aug. 24, 2017

(51) Int. Cl.
*B01J 20/18* (2006.01)
*C01B 39/46* (2006.01)
*B01D 53/04* (2006.01)

(52) U.S. Cl.
CPC .............. *B01J 20/18* (2013.01); *B01D 53/04* (2013.01); *B01J 20/186* (2013.01); *C01B 39/46* (2013.01); *B01D 2253/1085* (2013.01)

(58) Field of Classification Search
CPC ................................. B01J 20/18; C01B 39/46
See application file for complete search history.

(56) References Cited

U.S. PATENT DOCUMENTS

| 2,810,454 | A | 10/1957 | Jones et al. |
| 3,928,004 | A | 12/1975 | Bligh et al. |
| 3,996,028 | A | 12/1976 | Golovko et al. |
| 4,503,024 | A | 3/1985 | Bourgogne et al. |
| 4,732,580 | A | 3/1988 | Jain et al. |
| 4,925,460 | A | 5/1990 | Coe et al. |
| 4,943,304 | A | 7/1990 | Coe et al. |
| 5,026,532 | A | 6/1991 | Gaffney et al. |
| 5,159,816 | A | 11/1992 | Kovak et al. |
| 5,169,413 | A | 12/1992 | Leavitt |
| 5,258,060 | A | 11/1993 | Gaffney et al. |
| 5,266,102 | A | 11/1993 | Gaffney et al. |
| 5,313,800 | A | 5/1994 | Howard et al. |
| 5,601,634 | A | 2/1997 | Jain et al. |
| 5,730,003 | A | 3/1998 | Nguyen et al. |
| 6,240,744 | B1 | 6/2001 | Agrawal et al. |
| 6,500,235 | B2 | 12/2002 | Zhong et al. |
| 6,527,831 | B2 | 3/2003 | Baksh et al. |
| 7,501,009 | B2 | 3/2009 | Graham et al. |
| 2002/0121193 | A1 | 9/2002 | Baksh et al. |
| 2002/0134240 | A1 | 9/2002 | Zhong et al. |
| 2002/0144596 | A1 | 10/2002 | Dee et al. |
| 2014/0251135 | A1 | 9/2014 | Kwon et al. |

FOREIGN PATENT DOCUMENTS

| CN | 102285666 | 12/2011 |
| CN | 102442679 | 5/2012 |
| CN | 102665902 | 9/2012 |
| CN | 105314648 | 2/2016 |
| TW | 562692 | 11/2003 |
| TW | 201021898 | 6/2010 |

OTHER PUBLICATIONS

Jin Shang, et al, "Determination of Composition Range for "Molecular Trapdoor" Effect in Chabazite Zeolite", The Journal of Physical Chemistry, 2013, 12841-12847.
Luis J. Smith, et al, "Potassium Cation Effects on Site Preferences in the Mixed Cation Zeolite Li, Na-Chabazite", Chemistry of Materials, 2001, 385-391.
Jin Shang, et al, "Discriminative Separation of Gases by a "Molecular Trapdoor" Mechanism in Chabazite Zeolites", Journal of the American Chemical Society, 2012, 19246-19253.
AIR Products and Chemicals, Inc. (Declaration of William Jack Casteel, Jr. under C.F.R. 1.132), Dated Dec. 14, 2017.
Robson, Harry. Verified Syntheses of Zeolitic Materials—Second Revised Edition, Published 2001 on behalf of the Synthesis Commission of the International Zeolite Association by Elsevier.
Thrush, Kathleen A. and Kuznicki, Steven M. Characterization of Chabazite and Chabazite-like Zeolites of Unusual Composition. Journal of the American Chemical Society, Published Jan. 1, 1991 on Url: <http://pubs.rse.org>.
Jin Shang, Gang Li, Ranjeet Singh,Penny Xiao, Jefferson Z. Liu and Paul A. Webley. Determination of Composition Range for "Molecular Trapdoor" Effect in Chabazite Zeolite. The Journal of Physical Chemistry, Published May 20, 2013, pp. 12841-12847.
Jin Shang, Gang Li, Ranjeet Singh, Qinfen Gu, Kate M. Nairn, Timothy J. Bastow, Nikhil Medhekar, Cara M. Doherty, Jefferson Z. Liu and Paul A. Webley. Discriminative Separation of Gases by a "Molecular Trapdoor" Mechanism in Chabazite Zeolites. The Journal of American Chemical Society, Published Oct. 30, 2012, pp. 19246-19253.
Jin Shang, et al, "Discriminative Separation of Gases by a 'Molecular Trapdoor' Mechanism in Chabazite Zeolites", Journal of the American Chemical Society, pp. 19246-19252, Oct. 30, 2012.

(Continued)

*Primary Examiner* — Melvin C. Mayes
*Assistant Examiner* — Michael Forrest
(74) *Attorney, Agent, or Firm* — Eric J. Schaal

(57) ABSTRACT

An adsorbent having a composition comprising at least 90% chabazite where the chabazite is a single phase chabazite having an Si/Al ratio of 1.2 to 1.8, the chabazite includes a mixture of at least two types of cations, and each of the at least two types of cations are in a molar ratio relative to Al of at least 0.05.

13 Claims, 16 Drawing Sheets

(56) References Cited

OTHER PUBLICATIONS

Sang-Heon Shim, et al, "Chabazite: Energetics of hydration, enthalpy of formation, and effect of cations on stability", American Mineralogist, vol. 84, pp. 1870-1882, 1999.

MODIFIED CHABAZITE ADSORBENT COMPOSITIONS, METHODS OF MAKING AND USING THEM

TECHNICAL FIELD

This disclosure relates to adsorbent compositions, methods of making and using them. More specifically, this disclosure relates to adsorbent compositions particularly useful for kinetically separating oxygen from oxygen-containing streams such as for purifying crude argon, or nitrogen from air. The adsorbents are kinetically selective zeolite adsorbents for oxygen, effective at ambient or sub-ambient temperatures. More particularly, the adsorbents are modified chabazite-type zeolites.

BACKGROUND

In the gas production industry, there is a need to efficiently separate oxygen from oxygen-containing streams at ambient or sub-ambient temperatures.

In cryogenic air separation, nitrogen ($N_2$), oxygen ($O_2$), and argon (Ar) are separated based on their boiling points and relative volatilities. A first cryogenic column is responsible for a rough separation of the three main components of air: nitrogen (78%); oxygen (21%); and argon (1%). A side stream is removed and sent to a second column known as the side arm column or crude argon column. This stream is called "crude" because it exits this side arm column at only about 95% argon. The conventional methods of further purifying this crude argon are limited to: "Deoxo" purification; getter bed technologies; and additional distillation. The Deoxo process reacts controlled amounts of hydrogen with the oxygen in the argon stream to remove the oxygen. Because the reaction of hydrogen and oxygen generates significant heat, this process can be dangerous if not controlled properly. Getter beds only function at lower oxygen concentrations by reacting oxygen with copper catalyst to form copper oxide. When high purity argon is desired, a third distillation column can be used to concentrate it. Unfortunately, these distillation columns require upwards of 200 stages due to the similarity in boiling points of oxygen and argon and are less economical than is desired.

To achieve a kinetic separation of $O_2$ from either $N_2$ or Ar by an adsorption mechanism, an adsorbent structure must be developed with very specific pore dimensions. Although the Lennard-Jones 6-12 kinetic diameter of Ar (3.40 Å) is smaller than that of $O_2$ (3.46 Å), $O_2$ is not a spherical molecule and has a minimum molecular dimension that could be exploited. Adsorption mechanisms suggest that the minimum molecular dimension is the limiting factor for kinetic exclusion. With the proper orientation, $O_2$ should diffuse into a pore with an effective diameter of 2.8 Å. Ar, a spherical molecule, will have a constant diameter of 3.4 Å. This 0.6 Å difference in diameters is the sensitivity that an $O_2$ selective adsorbent must demonstrate. With such an adsorbent, a process could be contrived that purifies crude argon from the cryogenic air separation process in a safer and more economical manner and purifies $N_2$ from $O_2$ much more rapidly and efficiently.

Carbon molecular sieves have been developed that selectively adsorb $O_2$ over $N_2$ based on the smaller kinetic diameter of the $O_2$ molecule, see e.g. Yang, R. T. (*Gas Separation by Adsorption Processes*, Butterworths, Boston, 1987). More recently, in S. U. Rege and R. T. Yang (*Adsorption*, 2000, Vol. 6, 15-22), and U.S. Pat. No. 7,501,009 to Graham, et al., carbon molecular sieves are proposed for removal of $O_2$ from Ar by kinetic separation.

Nevertheless, use of carbon molecular sieves for the purification of crude $N_2$ or Ar presents a number of problems, including, but not limited to, a potential for combustion if returned to the cryogenic distillation tower, variable pore size distribution, and other drawbacks. Zeolites are porous aluminosilicates, which are non-combustible and contain well controlled pore sizes based on their highly crystalline structure. As a result, they may overcome many of these drawbacks.

A chabazite-type zeolite has a three-dimensional pore structure containing channels with 8-membered oxygen ring openings of 3.8 angstroms. This ring diameter is close to the target pore dimension discussed for the kinetic separation of $O_2$ from Ar and $N_2$ vide supra. Naturally occurring chabazite-type zeolites are known, which have a variety of compositions and cations to balance the $AlO_2$ unit charges of the aluminosilicate. Typical natural chabazite compositions are $M_x(Si_{25.5}Al_{10.5}O_{72})$, where M is a mixture of cations and x is chosen to balance the charge of the $AlO_2$ groups. Synthetic chabazites have been prepared by several methods including crystallization from Y-type zeolite as a raw material under hydrothermal conditions.

Chabazite zeolites are often described in terms of the ratio of Si to Al atoms in the framework of the zeolite composition. Hereafter, ratios with respect to silicon and aluminum atoms refer to atoms in the zeolite framework. Chabazite zeolites are often referred to in shorthand. For example, chabazite is often abbreviated as CHA. Hereafter a chabazite composition with a specific Si/Al ratio will be defined by specifying the Si/Al ratio in parenthesis. For example chabazite with Si/Al of 1.6 will be specified by CHA (1.6).

Natural chabazites typically have Si/Al ratios ranging from 2.2 to 3.5. Compositions isostructural to chabazite (CHA) with an Si/Al ratio as low as 1.4 and containing iron in their zeolite framework have been observed in nature (E. Passaglia in *Natural Zeolites: Occurrence, Properties, Use*, Pergamom Press, 1978, pp. 45-52.) Large quantities of pure natural chabazites are not readily available.

What appear to be single phase, synthetic CHA compositions with Si/Al from 1 to 1.5 have been described by Barrer in two publications. In the first, R. M. Barrer and J. W. Baynham (*J. of the Chemical Society*, 1956, 2892-2903) report compositions prepared by direct synthesis with Si/Al ranging from 1.15 to 1.36 and >1.96. No specific synthesis route was included and only limited analytical data was reported for these compositions. CHA compositions isolated with only a single cation type were reported for compositions with Si/Al<1.96. Chabazite compositions with mixed Na and Ca cation substitution were reported for compositions based on natural chabazite with Si/Al=2.5.

Low temperature adsorption data reported in this publication and collected at about −182° C. showed that, based on the slow uptake rates, $O_2$ and Ar are both effectively excluded by CHA structures with Si/Al of 1.36 or less, regardless of cation substitution. This suggests that these compositions would be unsuitable for separating $O_2$ from Ar.

In the second publication, R. M. Barrer and D. E. Mainwaring (*J. of the Chemical Society, Dalton Transactions*, 1972, 1254-1259) reported CHA compositions with Si/Al ranging from 1.07 to 1.5 and CHA with Si/Al=2.25. The compositions were prepared from KOH, metakaolinite, and amorphous silica gel. Even though the reported chabazites were prepared from varying gel compositions with $SiO_2$ to $Al_2O_3$ ratios ranging from 2 to 10, no chabazites with Si/Al from 1.5 to 2.25 were observed. This suggests these are not stable compositions under the conditions described by Barrer. Materials with Si/Al=1 and 2.25 were characterized by X-ray diffraction, but no analytical data were reported on compositions with Si/Al>1 and <1.5. Again, no mixed cation forms of these CHA compositions were reported. Data from adsorption studies on Li, Na, K, Ca, and H forms of CHA (Si/Al=2.25) were reported. Uptake of $O_2$ was observed at −195° C. in all of the cation forms with the exception of potassium. KCHA (2.25) completely excluded $O_2$ at this temperature suggesting the pores become too small with potassium cations at or below this Si/Al ratio.

In U.S. Pat. No. 5,026,532, Coe and Gaffney describe a process for the preparation of chabazites with an Si/Al ratio ranging from 1.8 to 2.3. The synthesis of CHA (2.1) is described from aluminum hydroxide, silica sol, sodium hydroxide and potassium hydroxide with tetramethylammonium hydroxide as a templating agent. No mixed cation forms of these chabazite compositions were reported.

In U.S. Pat. No. 4,943,304, Coe and Gaffney teach the use of Ca exchanged chabazites with Si/Al of 1.8 to 2.7 for the purification of bulk gases from impurity gases wherein the bulk gas is largely excluded from zeolite. The bulk gases include gases that bind less strongly to the chabazite than nitrogen as well as those that are excluded because of their larger size than nitrogen. These include argon, hydrogen, helium, krypton, neon, and tetrafluoromethane among others. In this application $N_2$ capacity data is shown for lower Si/Al calcium chabazite compositions including those with Si/Al of 1, 1.3, 1.6, and 1.72. No mixed cation chabazites in this Si/Al range are reported. Furthermore, the utility of chabazites compositions with Si/Al lower than 1.8 is dismissed, based on the relatively low nitrogen capacity of the compositions compared with chabazites with higher Si/Al ratio. P. Webley and coworkers (*J. Phys. Chem. C*, 2013, 117, 12841-12847) disclose a range of CHA compositions which vary in cation content and Si/Al ratio and include mixed cation type chabazites. In this work, framework Si/Al compositions range from 1.04 to well above 2.0; however to prepare CHA compositions with Si/Al=1.5 and below, Webley uses the process described by Kuznicki (*J. Chem. Soc., Faraday Transactions*, 1991, 87(1), 1031-1035). This process of making Al-rich CHA uses CHA (2.5) contacted with NaOH and alumina. According to Kuznicki, the compositions formed by his method with nominal Si/Al ratio between 1 and 2.5 are, in fact, mixtures of CHA (1) and CHA (2.5). Such materials are expected to give a mixture of the adsorption behavior of the two materials in the composition. A single, single phase composition is not derived by this method and so the mixed cation chabazite compositions reported by Webley, differ from the low Si compositions of this invention. The compositions of this invention are essentially of a single phase and therefore are expected to have a single pore structure and dimension, and unique adsorption properties. By "single phase" it is meant that the composition is at least 90% of one type of CHA with a specific Si/Al ratio, e.g. CHA (1.6), as opposed to blends of chabazites with two different Si/Al ratios.

Thus, by virtue of the potential benefits, there is a need for homogenous, single phase zeolite adsorbents having high kinetic selectivity for $O_2$ over Ar and $O_2$ over $N_2$ adsorption at both ambient and sub-ambient temperatures. Disclosed herein are zeolite compositions, particularly chabazite compositions that meet these and other goals.

For the adsorptive separation of $O_2$ from oxygen-containing streams using zeolitic adsorbents, the Webley group (*Adsorption*, 11, 173-177 (2005)) describes the use of potassium chabazite with Si/Al ratios of 2.4 to demonstrate selective adsorption of $O_2$ over Ar at a range of temperatures from 0° to 50° C., however such equilibrium based materials have been observed to exhibit very slow uptake of $O_2$.

A number of other researchers mention equilibrium-based separations of $O_2$ from Ar, but there are few rapid kinetic separations reported. Most of these kinetic separations use carbon molecular sieves (CMS), which by virtue of size selectivity are able to absorb $O_2$ at rates about 30× faster than Ar at ambient temperatures (U.S. Pat. No. 6,500,235 and S. U. Rege and R. T. Yang, *Adsorption*, 2000, Vol. 6, 15-22). U.S. Pat. No. 6,500,235 also mentions the use of a transition metal containing metal organic framework (MOF). Both materials show relatively slow uptake, and because they contain organic components, must be filtered should these streams be recycled back to a cryogenic stream.

Only a few zeolite materials have been reported for the kinetic separation of $O_2$ from $N_2$ or Ar at ambient temperatures. S. Kuznicki, B. Dunn, E Eyring and D. Hunter (*Separation Science and Technology* 2009, 44:7, pp 1604-1620) report the kinetic separation of $O_2$ from Ar using the Ba exchanged titanosilicate, BaRPZ-3. Rates appear to be slow for this material and the kinetic selectivity of $O_2/Ar<10$. S. Farooq (*Gas Separations and Purification*, Vol. 9, No. 3, pp 205-212) describes the possible use of a modified 4A material, RS-10 from UOP, which shows kinetic selectivity for $O_2$ adsorption over $N_2$ and Ar comparable to carbon molecular sieves, at similar $O_2$ uptake rates to the CMS materials.

At sub-ambient temperatures, D. W. Breck (*Zeolite Molecular Sieves*, Robert E. Krieger Publishing Co., 1984) describes the use of zeolite 4A in kinetic $O_2/N_2$ and $O_2/Ar$ separations.

Kovak et al. in U.S. Pat. No. 5,159,816 mention the use of a list of zeolite adsorbents including 5A, 4A, mordenite, 13X, and chabazite for oxygen and nitrogen adsorption in cryogenic TSA processes.

Gary et al. in U.S. Pat. No. 6,083,301 teaches the use adsorbents including zeolites with a Si/Al ratio<1.15 for removing impurities from an inert fluid stream; however, the specification teaches the use of zeolite X as the zeolite adsorbent.

Thus, it is desirable to develop zeolite adsorbents that are useful in the separation of $O_2$, $N_2$, and Ar. Such adsorbents themselves can have any of the following properties: greater selectivity, faster adsorption and desorption, increased $O_2$ capacity, increased productivity and easier regeneration (e.g. heat-free, or vacuum-free), and other qualities.

SUMMARY

Disclosed herein are adsorbents comprising: a composition comprising at least 90% chabazite; wherein the chabazite is a single phase chabazite having an Si/Al ratio of 1.2 to 1.8; the chabazite includes a mixture of at least two types of cations; and each of the at least two types of cations are in a molar ratio relative to Al of at least 0.05.

The at least two types of cations of the adsorbents may be selected from Li, Na, Ag, K, Ca, Mg, Zn, Cu, Ba, and Sr ions. Specifically the at least two types of cations may comprise K and Na ions. Further, the K and Na cations may be in a molar ratio of 0.05 to 1.25 K:Na.

The mixed cation chabazite of the adsorbent may be aK,NaCHA, wherein a represents the number of potassium cations, and a is from 1 to 7. The mixed cation chabazite of the adsorbent may be $K_aNa_{(b-a)}CHA$, where b represents the total number of cations per unit of CHA and is from 12 to 18, and a represents the number of potassium cations and is from 1 to 7. The mixed cation chabazite of the adsorbent may be 1K,NaCHA; 2K,NaCHA; 3K,NaCHA; 4K,NaCHA; or 6K,NaCHA.

The chabazite of the adsorbent may have an Si/Al ratio from 1.35 to 1.6. The chabazite may be selected from 3K,NaCHA (1.6); 4K,NaCHA (1.6); 6K,NaCHA (1.6); 2K,NaCHA (1.4), and 1K,NaCHA (1.35).

Some embodiments of the adsorbents of the invention are further set forth below:

Embodiment 1

An adsorbent comprising: a composition comprising at least 90% chabazite; wherein the chabazite is a single phase chabazite having an Si/Al ratio of 1.2 to 1.8; the chabazite includes a mixture of at least two types of cations; and each of the at least two types of cations are in a molar ratio relative to Al of at least 0.05.

Embodiment 2

The adsorbent in accordance with Embodiment 1, wherein the at least two types of cations are selected from Li, Na, Ag, K, Ca, Mg, Zn, Cu, Ba, and Sr ions.

Embodiment 3

The adsorbent in accordance with Embodiment 1, wherein the mixture of the at least two types of cations comprise K and Na ions.

Embodiment 4

The adsorbent in accordance with Embodiment 3, wherein the K and Na cations are in a molar ratio of 0.05 to 1.25 K:Na.

Embodiment 5

The adsorbent in accordance with any one of the Embodiments 1-4, wherein the mixed cation chabazite is aK,NaCHA, wherein a represents the number of potassium cations, and a is from 1 to 7.

Embodiment 6

The adsorbent in accordance with any one of the Embodiments 1-4, wherein the mixed cation chabazite is $K_aNa_{(b-a)}$CHA, where b represents the total number of cations per unit of CHA and is from 12.9 to 16, and a represents the number of potassium cations and is from 1 to 7.

Embodiment 7

The adsorbent in accordance with any one of the Embodiments 1-6, wherein the mixed cation chabazite is 1K,NaCHA; 2K,NaCHA; 3K,NaCHA; 4K,NaCHA; or 6K,NaCHA.

Embodiment 8

The adsorbent in accordance with any one of the Embodiments 1-5, wherein the chabazite has a Si/Al ratio from 1.35 to 1.6.

Embodiment 9

The adsorbent in accordance with any one of the Embodiments 1-5 and 8, wherein the chabazite is selected from 3K,NaCHA (1.6); 4K,NaCHA (1.6); 6K,NaCHA (1.6); 2K,NaCHA (1.4); and 1K,NaCHA (1.35).

These and other embodiments apparent to those of skill in the art are within the spirit and scope of this disclosure.

DETAILED DESCRIPTION

Figure 1:
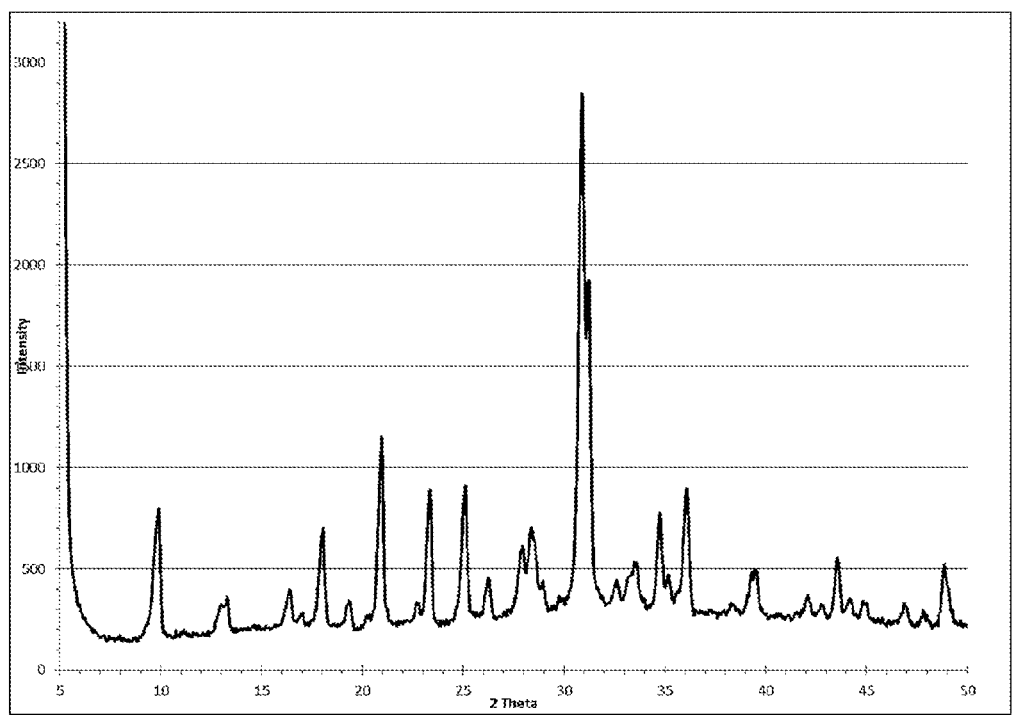
FIG. 1 is an X-ray diffraction pattern for Example 1a: chabazite with Si/Al=2 (KCHA (2.0))
Figure 2:
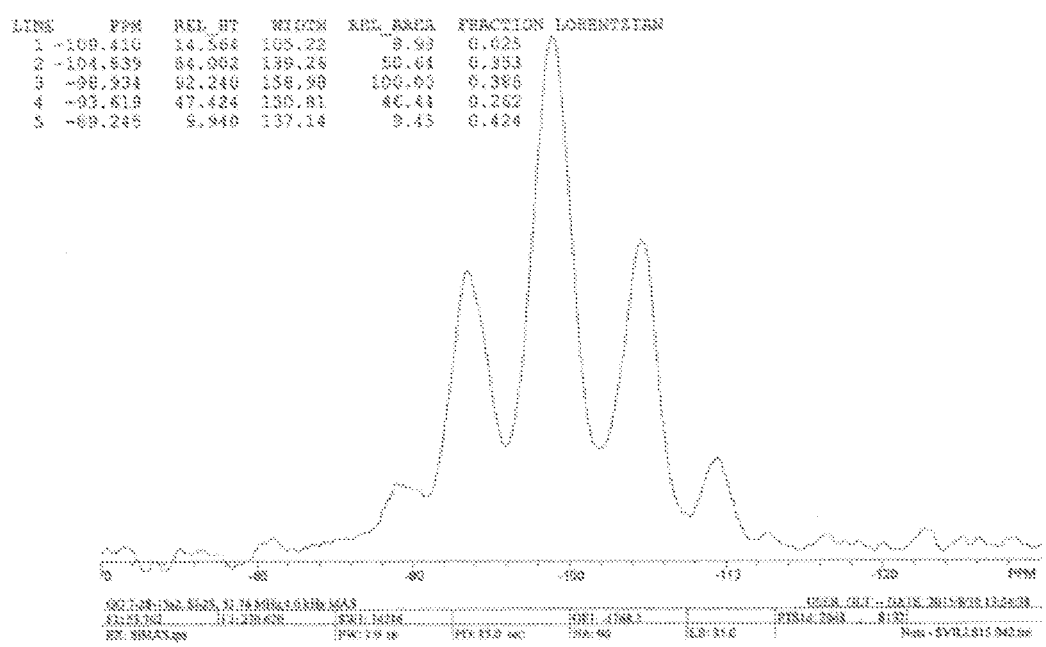
FIG. 2 is an $^{29}$Si-NMR spectra for Example 1a (KCHA (2.0))
Figure 3:
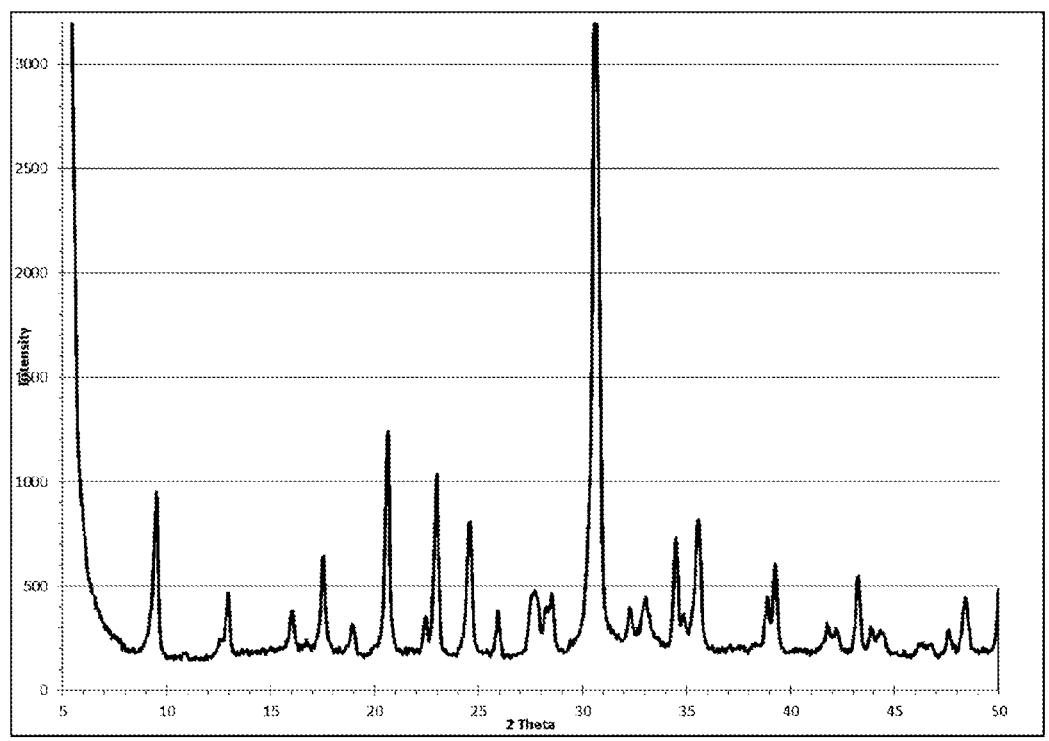
FIG. 3 is an X-ray diffraction pattern for Example 1b chabazite with Si/Al=1.85: (KCHA (1.85))
Figure 4:
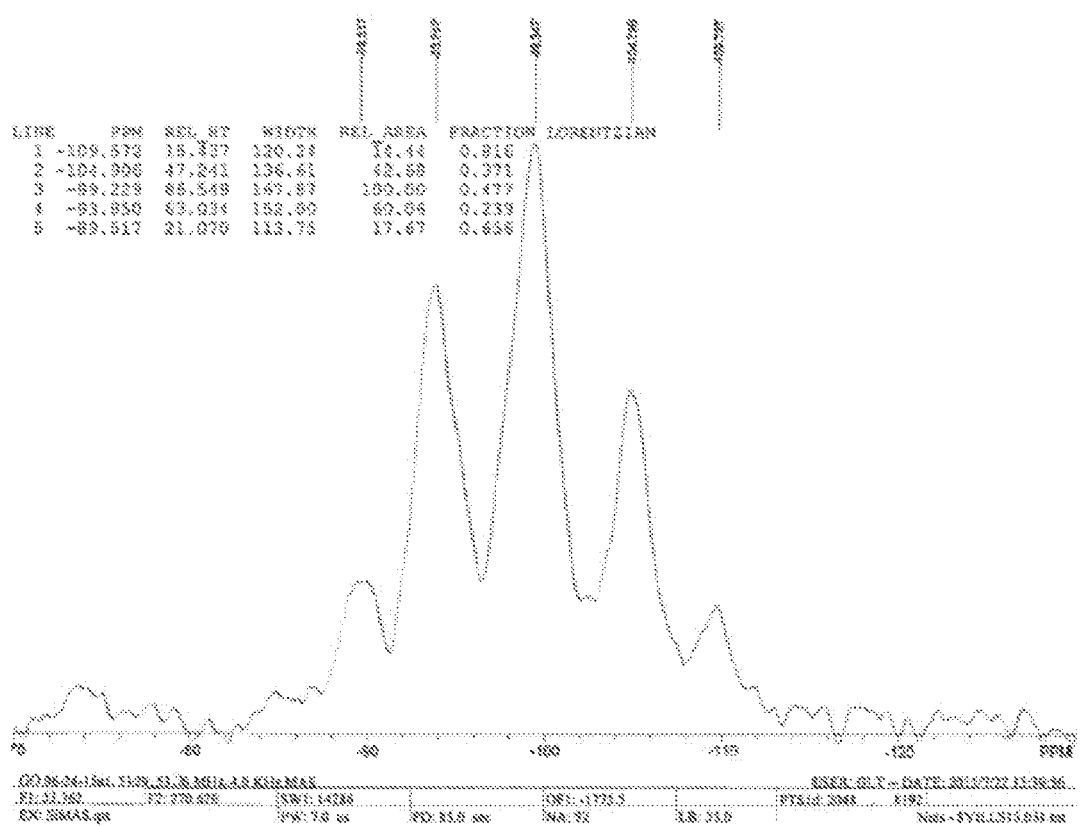
FIG. 4 is an $^{29}$Si-NMR spectra for Example 1b (KCHA (1.85))
Figure 5:
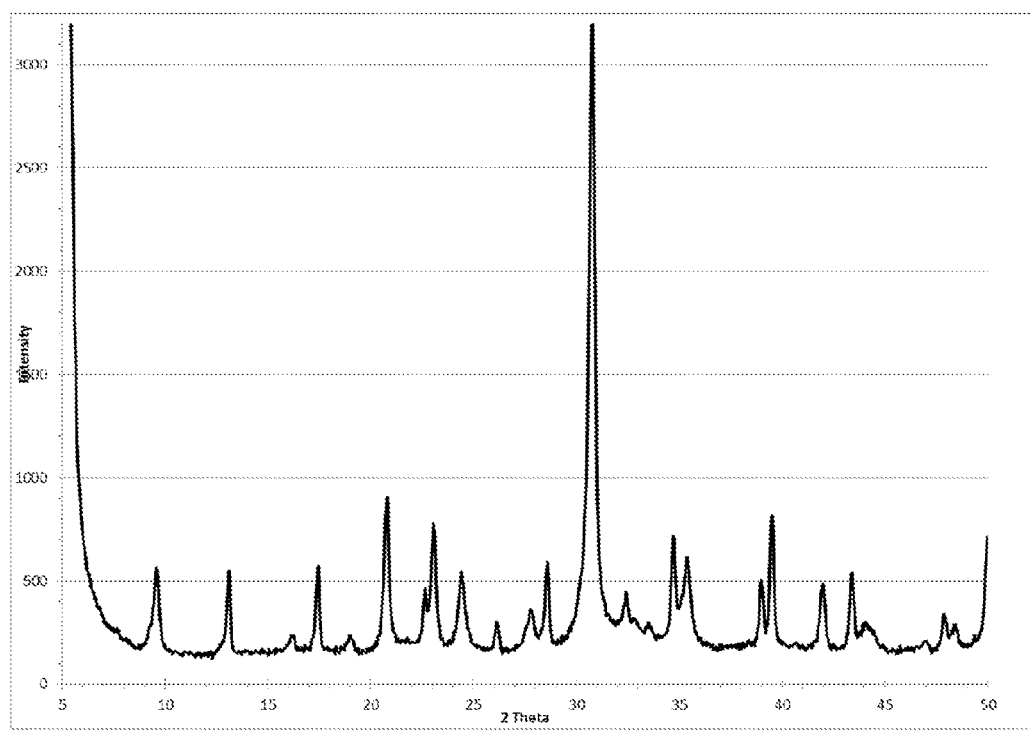
FIG. 5 is an X-ray diffraction pattern for Example 1c: chabazite with Si/Al=1.6 (KCHA (1.6)
Figure 6:
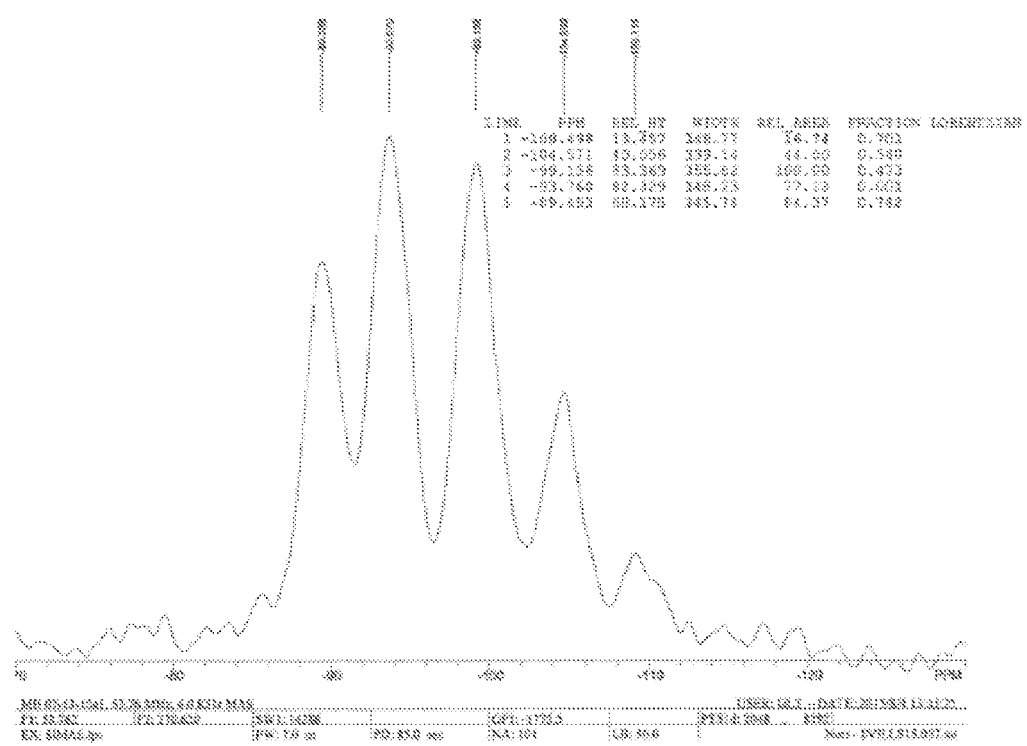
FIG. 6 is an $^{29}$Si-NMR spectra for Example 1c (KCHA (1.6))
Figure 7:
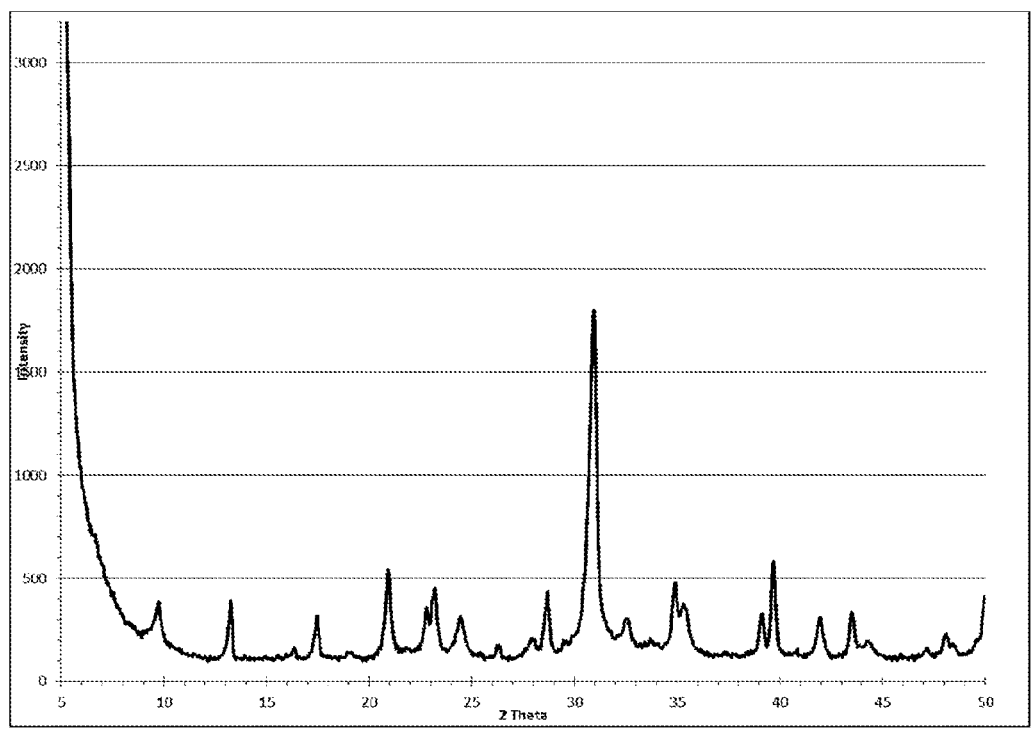
FIG. 7 is an X-ray diffraction pattern for Example 1d: chabazite with Si/Al=1.35 (KCHA (1.35))
Figure 8:
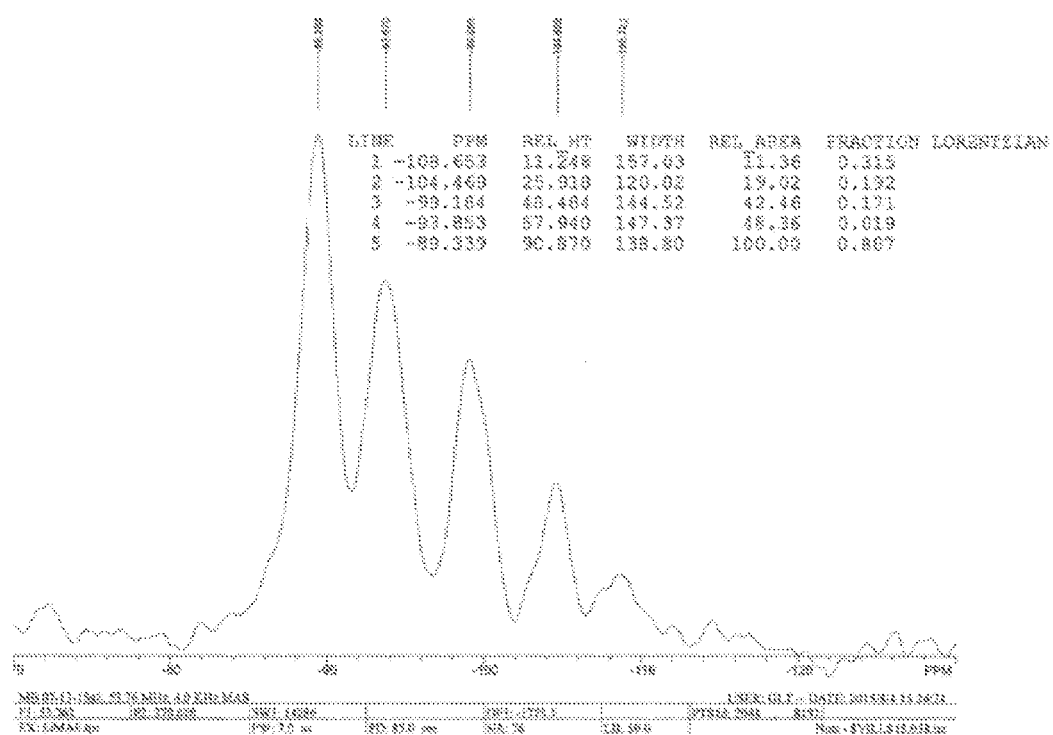
FIG. 8 is an $^{29}$Si-NMR spectra for Example 1d (KCHA (1.35))

This disclosure focuses on adsorbents which can remove oxygen from crude argon or crude nitrogen streams by a kinetic separation, but recognizes that any oxygen-containing stream from any source may be used. The oxygen containing fluid streams comprise from 0.5 mole % oxygen to 49.5 mole % oxygen, or from 2.5 mole % oxygen to 29.5 mole % oxygen. This disclosure also relates to methods of making such adsorbents and methods of separating oxygen from oxygen-containing fluids using such adsorbents.

U.S. patent application Ser. No. 15/049,704 (now U.S. Pat. No. 9,708,188) (awaiting application number assignment), entitled Method for Argon Production Via Cold Pressure Swing Adsorption (Docket number 07941, filed concurrently herewith, and hereby incorporated by reference in its entirety, details apparatus and methods for the purification of argon via cold vapor pressure swing adsorption (PSA). Additionally, U.S. patent application Ser. Nos. 15/049,659 and 15/049,634 (now U.S. Pat. No. 9,708,188) (awaiting application number assignment), entitled Modified Chabazite Adsorbent Compositions, Methods of Making and Using Them (Docket numbers 07952 and 07953, filed concurrently herewith (and hereby incorporated by reference in their entirety) further describe modified chabazites that are well-suited to use in the systems and methods described herein. As noted in that application, adsorbents perform differently under different operating conditions.

This disclosure relates to single phase chabazite zeolite compositions with a Si/Al ratio from 1.0 to 2.2. These chabazite compositions demonstrate improved productivity, capacity, and/or regenerative properties at ambient (0 to 40° C.) and sub-ambient (<0° C.) temperatures that make them suitable for Ar or $N_2$ PSA applications.

The compositions of this invention provide high kinetic selectivity for $O_2$ vs. Ar and $O_2$ vs. $N_2$ adsorption at both ambient and sub-ambient temperatures. Effective equilibrium selectivity for $O_2$ vs. $N_2$ and $O_2$ vs. Ar are observed at sub-ambient temperatures, because $N_2$ and Ar uptake become extremely slow for the compositions of this invention. Thus, $O_2$ is readily separated.

The compositions include single phase chabazite zeolite compositions with a Si/Al ratio from 1.0 to 2.2, which contain a mixture of two or more cation types. By "single phase" it is meant that the composition is at least 90% of one type of CHA with a specific Si/Al ratio (e.g. CHA (1.6) is at least 90% CHA having a Si/Al ratio of 1.6). Chabazites with more than 10% impurities can be found in nature; limiting impurities to less than 10% improves performance of the chabazite. By requiring the composition to be at least 90% of one type of chabazite with a specific Si/Al ratio within the recited Si/Al ratio ranges, blends of higher and lower ratio chabazites are avoided, and the beneficial characteristics of a highly regular pore dimension for gas separation are seen. For example, Webley employs methods described by Kuznicki, who acknowledges compositions formed with nominal Si/Al ratios between 1 and 1.8 are, in fact, mixtures of CHA (1) and CHA (2.5), rather than the single phase compositions described herein. Barrer et al. describe pure CHA compositions with Si/Al=1 and present adsorption data showing exclusion of $O_2$, Ar, and $N_2$ at low temperature regardless of cation. In separate work, Webley presents adsorption data for natural CHA (2.4) and shows that potassium chabazite with an Si/Al ratio of 2.4 demonstrates selective adsorption of $O_2$ over Ar at a range of temperatures from 0° C. to 50° C.; however, such equilibrium based materials have been observed to exhibit very slow uptake of $O_2$ at ambient temperatures, i.e. ~23° C. Barrer has shown adsorption of $O_2$, $N_2$, and Ar for CHA (2.4) when substituted with cations smaller than potassium. Thus, the Si/Al ratio and type of cation exchange affect the nominal chabazite 3.8 Å pore dimension sufficiently that CHA zeolites can go from excluding $N_2$, Ar, and $O_2$ to adsorbing them upon increasing its Si/Al ratio from 1 to 2.4. As will be recognized from reading this specification, the performance of a CHA at a Si/Al ratio of 1.6 (CHA (1.6)) is preferred over either CHA (1) or CHA (2.5). A blend of CHA (1) and CHA (2.5) averaging out to CHA (1.6) is not the same as a single phase CHA (1.6) composition. Based on prior adsorption studies, a blend of CHA (1) and CHA (2.5) will have a mixture of two pore dimensions which either exclude or slowly adsorb $O_2$, Ar, and $N_2$ or adsorb all of these gases. In fact, we have observed this mixed adsorption behavior in a comparative example which contains a mixture of CHA (1.0) and CHA (2.0). (See Comparative Example 1, below, and FIGS. 9-11.) The compositions described herein take full advantage of the improved properties of the single phase compositions to achieve uniform pore dimensions, which are intermediate in size between CHA (1) and CHA (2.5) and consequently have high kinetic selectivity between $O_2$ and $N_2$ or Ar.

One with ordinary skill in the art of zeolite synthesis should realize that a wide range of silica and alumina containing reagents may be used in the proper molar ratios with the appropriate structure directing agents to achieve chabazites of this invention. This invention also describes a convenient method of preparing the compositions of this invention using zeolite NaY as a readily available source of silica and alumina, particularly when combined with hydrated aluminum hydroxide and potassium hydroxide.

Moreover, single and mixed cation chabazite zeolite compositions described herein and within the Si/Al range of this invention have unexpected gas adsorption properties, making them useful for gas separation applications.

Mixed cation chabazite zeolites include at least two cation types in various molar ratios and having at least one cation of each type in the unit cell structure. For example, potassium and sodium mixed cation chabazites can be made in K:Na molar ratios of a:(b-a), particularly 1:(b-1), 2:(b-2), and 3:(b-3), 4:(b-4) or 6:(b-6), where b is the number of Na cations per unit cell of the original CHA structure; i.e. b is the total number of cations per unit cell, some of which are replaced by a potassium ions. The range of b is dictated by the Si/Al ratios of the compositions of this invention and, so b ranges from 11.25 to 18, and in some embodiments from 12.8 to 15.3 for the compositions of this invention. The number of potassium cations, a, ranges from 1 to 7. The ratio a:(b-a) (K:Na) may be about 0.05 to about 1.25. Table 1, below, shows various values of a, b, and (b-a) for a given Si/Al ratio and desired K content from fully exchanged Na (a=0) to seven potassium equivalents (a=7). The value of b is calculated based on the desired Si/Al ratio. Notably, these are calculated values, which differ slightly from the numbers presented elsewhere, for example, the "Nominal Compositions" of Example 1, below.

TABLE 1

| Si/Al Ratio | b | Ka | Na(b − a) | Alb | Si(36 − b) | K:Na | Na/Al |
| --- | --- | --- | --- | --- | --- | --- | --- |
| 1 | 18.00 | 0 | 18.00 | 18.00 | 18.00 | 0.00 | 1.00 |
| 1 | 18.00 | 1 | 17.00 | 18.00 | 18.00 | 0.06 | 0.94 |
| 1 | 18.00 | 2 | 16.00 | 18.00 | 18.00 | 0.13 | 0.89 |
| 1 | 18.00 | 3 | 15.00 | 18.00 | 18.00 | 0.20 | 0.83 |
| 1 | 18.00 | 4 | 14.00 | 18.00 | 18.00 | 0.29 | 0.78 |
| 1 | 18.00 | 5 | 13.00 | 18.00 | 18.00 | 0.38 | 0.72 |
| 1 | 18.00 | 6 | 12.00 | 18.00 | 18.00 | 0.50 | 0.67 |
| 1 | 18.00 | 7 | 11.00 | 18.00 | 18.00 | 0.64 | 0.61 |
| 1.1 | 17.14 | 1 | 16.14 | 17.14 | 18.86 | 0.06 | 0.94 |
| 1.1 | 17.14 | 2 | 15.14 | 17.14 | 18.86 | 0.13 | 0.88 |
| 1.1 | 17.14 | 3 | 14.14 | 17.14 | 18.86 | 0.21 | 0.83 |
| 1.1 | 17.14 | 4 | 13.14 | 17.14 | 18.86 | 0.30 | 0.77 |
| 1.1 | 17.14 | 5 | 12.14 | 17.14 | 18.86 | 0.41 | 0.71 |
| 1.1 | 17.14 | 6 | 11.14 | 17.14 | 18.86 | 0.54 | 0.65 |
| 1.1 | 17.14 | 7 | 10.14 | 17.14 | 18.86 | 0.69 | 0.59 |
| 1.2 | 16.36 | 0 | 16.36 | 16.36 | 19.64 | 0.00 | 1.00 |
| 1.2 | 16.36 | 1 | 15.36 | 16.36 | 19.64 | 0.07 | 0.94 |
| 1.2 | 16.36 | 2 | 14.36 | 16.36 | 19.64 | 0.14 | 0.88 |
| 1.2 | 16.36 | 3 | 13.36 | 16.36 | 19.64 | 0.22 | 0.82 |
| 1.2 | 16.36 | 4 | 12.36 | 16.36 | 19.64 | 0.32 | 0.76 |
| 1.2 | 16.36 | 5 | 11.36 | 16.36 | 19.64 | 0.44 | 0.69 |
| 1.2 | 16.36 | 6 | 10.36 | 16.36 | 19.64 | 0.58 | 0.63 |
| 1.2 | 16.36 | 7 | 9.36 | 16.36 | 19.64 | 0.75 | 0.57 |
| 1.3 | 15.65 | 0 | 15.65 | 15.65 | 20.35 | 0.00 | 1.00 |
| 1.3 | 15.65 | 1 | 14.65 | 15.65 | 20.35 | 0.07 | 0.94 |
| 1.3 | 15.65 | 2 | 13.65 | 15.65 | 20.35 | 0.15 | 0.87 |
| 1.3 | 15.65 | 3 | 12.65 | 15.65 | 20.35 | 0.24 | 0.81 |
| 1.3 | 15.65 | 4 | 11.65 | 15.65 | 20.35 | 0.34 | 0.74 |
| 1.3 | 15.65 | 5 | 10.65 | 15.65 | 20.35 | 0.47 | 0.68 |
| 1.3 | 15.65 | 6 | 9.65 | 15.65 | 20.35 | 0.62 | 0.62 |
| 1.3 | 15.65 | 7 | 8.65 | 15.65 | 20.35 | 0.81 | 0.55 |
| 1.4 | 15.00 | 0 | 15.00 | 15.00 | 21.00 | 0.00 | 1.00 |

TABLE 1-continued

| Si/Al Ratio | b | Ka | Na(b − a) | Alb | Si(36 − b) | K:Na | Na/Al |
|---|---|---|---|---|---|---|---|
| 1.4 | 15.00 | 1 | 14.00 | 15.00 | 21.00 | 0.07 | 0.93 |
| 1.4 | 15.00 | 2 | 13.00 | 15.00 | 21.00 | 0.15 | 0.87 |
| 1.4 | 15.00 | 3 | 12.00 | 15.00 | 21.00 | 0.25 | 0.80 |
| 1.4 | 15.00 | 4 | 11.00 | 15.00 | 21.00 | 0.36 | 0.73 |
| 1.4 | 15.00 | 5 | 10.00 | 15.00 | 21.00 | 0.50 | 0.67 |
| 1.4 | 15.00 | 6 | 9.00 | 15.00 | 21.00 | 0.67 | 0.60 |
| 1.4 | 15.00 | 7 | 8.00 | 15.00 | 21.00 | 0.88 | 0.53 |
| 1.5 | 14.40 | 0 | 14.40 | 14.40 | 21.60 | 0.00 | 1.00 |
| 1.5 | 14.40 | 1 | 13.40 | 14.40 | 21.60 | 0.07 | 0.93 |
| 1.5 | 14.40 | 2 | 12.40 | 14.40 | 21.60 | 0.16 | 0.86 |
| 1.5 | 14.40 | 3 | 11.40 | 14.40 | 21.60 | 0.26 | 0.79 |
| 1.5 | 14.40 | 4 | 10.40 | 14.40 | 21.60 | 0.38 | 0.72 |
| 1.5 | 14.40 | 5 | 9.40 | 14.40 | 21.60 | 0.53 | 0.65 |
| 1.5 | 14.40 | 6 | 8.40 | 14.40 | 21.60 | 0.71 | 0.58 |
| 1.5 | 14.40 | 7 | 7.40 | 14.40 | 21.60 | 0.95 | 0.51 |
| 1.6 | 13.85 | 0 | 13.85 | 13.85 | 22.15 | 0.00 | 1.00 |
| 1.6 | 13.85 | 1 | 12.85 | 13.85 | 22.15 | 0.08 | 0.93 |
| 1.6 | 13.85 | 2 | 11.85 | 13.85 | 22.15 | 0.17 | 0.86 |
| 1.6 | 13.85 | 3 | 10.85 | 13.85 | 22.15 | 0.28 | 0.78 |
| 1.6 | 13.85 | 4 | 9.85 | 13.85 | 22.15 | 0.41 | 0.71 |
| 1.6 | 13.85 | 5 | 8.85 | 13.85 | 22.15 | 0.57 | 0.64 |
| 1.6 | 13.85 | 6 | 7.85 | 13.85 | 22.15 | 0.76 | 0.57 |
| 1.6 | 13.85 | 7 | 6.85 | 13.85 | 22.15 | 1.02 | 0.49 |
| 1.7 | 13.33 | 0 | 13.33 | 13.33 | 22.67 | 0.00 | 1.00 |
| 1.7 | 13.33 | 1 | 12.33 | 13.33 | 22.67 | 0.08 | 0.93 |
| 1.7 | 13.33 | 2 | 11.33 | 13.33 | 22.67 | 0.18 | 0.85 |
| 1.7 | 13.33 | 3 | 10.33 | 13.33 | 22.67 | 0.29 | 0.78 |
| 1.7 | 13.33 | 4 | 9.33 | 13.33 | 22.67 | 0.43 | 0.70 |
| 1.7 | 13.33 | 5 | 8.33 | 13.33 | 22.67 | 0.60 | 0.63 |
| 1.7 | 13.33 | 6 | 7.33 | 13.33 | 22.67 | 0.82 | 0.55 |
| 1.7 | 13.33 | 7 | 6.33 | 13.33 | 22.67 | 1.11 | 0.48 |
| 1.8 | 12.86 | 0 | 12.86 | 12.86 | 23.14 | 0.00 | 1.00 |
| 1.8 | 12.86 | 1 | 11.86 | 12.86 | 23.14 | 0.08 | 0.92 |
| 1.8 | 12.86 | 2 | 10.86 | 12.86 | 23.14 | 0.18 | 0.84 |
| 1.8 | 12.86 | 3 | 9.86 | 12.86 | 23.14 | 0.30 | 0.77 |
| 1.8 | 12.86 | 4 | 8.86 | 12.86 | 23.14 | 0.45 | 0.69 |
| 1.8 | 12.86 | 5 | 7.86 | 12.86 | 23.14 | 0.64 | 0.61 |
| 1.8 | 12.86 | 6 | 6.86 | 12.86 | 23.14 | 0.88 | 0.53 |
| 1.8 | 12.86 | 7 | 5.86 | 12.86 | 23.14 | 1.20 | 0.46 |
| 1.85 | 12.63 | 0 | 12.63 | 12.63 | 23.37 | 0.00 | 1.00 |
| 1.85 | 12.63 | 1 | 11.63 | 12.63 | 23.37 | 0.09 | 0.92 |
| 1.85 | 12.63 | 2 | 10.63 | 12.63 | 23.37 | 0.19 | 0.84 |
| 1.85 | 12.63 | 3 | 9.63 | 12.63 | 23.37 | 0.31 | 0.76 |
| 1.85 | 12.63 | 4 | 8.63 | 12.63 | 23.37 | 0.46 | 0.68 |
| 1.85 | 12.63 | 5 | 7.63 | 12.63 | 23.37 | 0.66 | 0.60 |
| 1.85 | 12.63 | 6 | 6.63 | 12.63 | 23.37 | 0.90 | 0.53 |
| 1.85 | 12.63 | 7 | 5.63 | 12.63 | 23.37 | 1.24 | 0.45 |

Mixed sodium, potassium exchanged forms of chabazite having framework Si/Al ratios from 1.2 to 1.8 with Na/Al ratios from 0.4 to 1.0 have the ability to adsorb significant amounts of $O_2$ from oxygen containing streams over a range of pressure and temperature conditions. $O_2$ over Ar equilibrium selectivities for pure gas components greater than 10 have been achieved at ambient pressure and 175K (−98° C.).

By careful choice of the cation composition and Si/Al range of the CHA from 1.2 to 1.8, the CHA compositions of this invention can be tuned to provide very high kinetic selectivity for the adsorption of $O_2$ compared with $N_2$ or Ar even at ambient temperatures. At ambient temperatures, fully Na exchanged CHA (1.6) was observed to show moderate kinetic $O_2$ selectivity over Ar and $N_2$ at relatively low $O_2$ uptake rate. Fully exchanging CHA (1.6) with the larger potassium cations led to $O_2$, Ar, and $N_2$ essentially being excluded from the zeolite, presumably due to the smaller pore dimension compared with NaCHA (1.6). Surprisingly, mixed K,NaCHA (1.6) compositions, in particular $K_3Na_{11}Al_{14}Si_{22}O_{72}$ (3K,NaCHA (1.6)), $K_4Na_{10}Al_{14}Si_{22}O_{72}$ (4K,NaCHA (1.6)), or $K_6Na_8Al_{14}Si_{22}O_{72}$ (6K,NaCHA (1.6)) showed not only better kinetic selectivity for $O_2$ vs. Ar and Na than fully NaCHA (1.6), presumably due to better tuned pore dimension, but also much faster $O_2$ uptake rate under ambient temperature conditions. It is not clear why an effectively smaller pore dimension would lead to both better selectivity and a higher $O_2$ uptake rate, but the homogenous, mixed K,NaCHA (1.6) compositions of this invention show this beneficial property, in some embodiments for ratios of K:Na of 0.05 to 1.25 and for K to Na ratios of 0.3 to 0.75. At Si/Al ratios lower than 1.5, for example 1.4, it was observed that, at ambient temperatures, $O_2$ uptake rates slow significantly compared to CHA materials with Si/Al>1.5. NaCHA (1.4) showed a very slow $O_2$ uptake rate with similar $N_2$ uptake, while effectively excluding Ar. Incorporation of 2 potassium cations into the unit cell of the NaCHA (1.4) to prepare 2K,NaCHA (1.4) ($K_2Na_{13}Al_{15}Si_{21}O_{72}$) again led to unexpected gas uptake behavior. The overall uptake rates of both $O_2$ and $N_2$ were increased, but, while $N_2$ showed a uniform uptake rate of 0.001 sec$^{-1}$, $O_2$ exhibited two uptake regions one much faster than that of $N_2$ and a second much slower. The total $O_2$ uptake was approximately equivalent to the $N_2$ uptake. In contrast, the higher Si/Al CHA materials typically adsorb twice as much $N_2$ as $O_2$. While not intended to be bound by theory, the uptake measurements suggest that the addition of two potassium cations to the unit cell leads to new sites in the CHA structure becoming accessible to $O_2$ and not $N_2$, which may help explain why the $O_2$ capacity of 3K,NaCHA (1.6) is also about 30% higher than NaCHA (1.6).

Remarkably, at 175K the $O_2$ capacity of the NaCHA adsorbents remains high even below an Si/Al of 1.5, while Ar is effectively excluded.

Each of the chabazite compositions described herein is an adsorbent composition particularly well-suited to remove oxygen from oxygen-rich streams, such as for the separation of oxygen in the purification of argon or nitrogen. The compositions are well suited for use in pressure swing adsorption techniques at ambient (−20° C. to 40° C.) and sub-ambient temperatures as low as −186° C. In some embodiments, temperatures of −150° C. to −50° C. are employed. The adsorbent compositions of this invention are particularly well-suited for PSA at about −130° C. to −80° C. Separation of oxygen involves contacting the oxygen-containing fluid stream with a specific composition having Si/Al ratio from 1.2 to 1.8 at ambient or sub-ambient temperatures, wherein said composition comprises a single phase, cation exchanged CHA composition.

Preparation of Single Phase KCHA

These compositions are readily prepared from zeolite NaY, hydrated aluminum hydroxide and potassium hydroxide. An adsorbent chabazite composition as described herein can be prepared relatively simply, by mixing NaY zeolite, aqueous Al(OH)$_3$, and aqueous KOH; and heating for an allotted amount of time to achieve a single phase KCHA composition having the desired Si/Al ratio of from 1 to 2.2. To achieve the desired Si/Al ratio, the ratio of hydrated aluminum hydroxide to NaY is adjusted in the presence of potassium hydroxide. Heating is typically conducted at about 70° C. to about 120° C. for 1-8 days as set out in Example 1. In some embodiments, heating is conducted at about 90° C. to about 100° C. and held at about 90° C. to about 100° C. for 1-8 days. The resultant composition is a single phase potassium-exchanged chabazite (KCHA) having a Si/Al ratio of 1 to 2.2 and wherein the K/Al molar ratio is greater than 0.90. (e.g. >90% of the CHA unit cell cations are potassium, the remaining unit cell cations being sodium). In some embodiments, the K/Al molar ratio is >0.90, >0.95, >0.97, >0.99, or any value or range of values between any two of these numbers.

Preparation of Single Phase NaCHA Compositions

Variants of the chabazite composition can be made. For example, a sodium exchanged chabazite composition in accordance with this disclosure can be made via an ion exchange of the single phase potassium chabazite to yield a single phase NaCHA composition having an Si/Al ratio of 1 to 2.2, wherein the Na/Al molar ratio is greater than 0.95. For example, the ion exchange may include mixing single phase KCHA having a Si/Al ratio of 1 to 2.2 with an excess of aqueous sodium ions to fully exchange the potassium ions for the sodium ions to yield a single phase NaCHA having a Si/Al ratio of 1 to 2.2. The exchange may be repeated several times to ensure full ion exchange. In some instances, the ion exchange comprises mixing single phase potassium chabazite having an Si/Al ratio of 1 to 2.2 with a 1M aqueous solution of NaCl having a 10-fold excess, by mole % of NaCl relative to the moles of cations of the single phase potassium chabazite composition, until the K is fully exchanged by Na to yield a single phase NaCHA composition. (See Example 2a.)

Preparation of Single Phase Mixed Cation CHA Compositions

Single phase mixed cation exchanged chabazite compositions having Si/Al ratio of at least 1 but less than 2.2 can be made from a single phase NaCHA composition having Si/Al ratio of at least 1 but less than 2.2 via ion exchange to yield a single phase mixed cation CHA including at least two types of cations. In some embodiments, a single phase NaCHA composition having Si/Al ratio of at least 1 but less than 2.2 is mixed with an aqueous solution of one or more desired cations to yield the desired mixed cation chabazite. In some embodiments, the mixed cation CHA comprises at least two types of cations where each is present in a molar ratio relative to Al of at least 0.05. Suitable types of cations include Li, Ag, Na, K, Ca, Mg, Zn, Cu, Ba, and Sr cations. In some embodiments, the types of cations are selected from Li cations, K cations, and combinations thereof. Each of the at least two types of cations are in a molar ratio relative to Al of at least 0.05.

In some instances, one equivalent of the NaCHA composition is ion exchanged with excess equivalents of the desired types of cations (M) in aqueous solution to yield a mixed M, NaCHA.

In some instances, one equivalent of the NaCHA composition is ion exchanged with a equivalents of K cations in aqueous solution to yield an aK,NaCHA having a K:Na ratio of a:(b-a), where a is the desired number of potassium cations and b is the total number of cations per unit CHA, where the range of b is dictated by the Si/Al ratios of 1.0 to 2.2. In some instances, b is 11.25 to 18 and a is 1 to 7. In some embodiments, b is about 12.8 to 15.3 and a is 1 to 7. In some embodiments, each of the two types of cations of the K,NaCHA composition are in a molar ratio relative to Al of at least 0.05.

For example, in some embodiments, the mixed cation exchanged chabazite is a potassium, sodium exchanged chabazite (e.g. $K_aNa_{(b-a)}Al_bSi_{(36-b)}O_{72}$) having a K:Na ratio of a:(b-a), where b is the total number of cations per unit cell of the CHA structure, a is the number of potassium cations per unit cell of the CHA structure and (b-a) is the number of sodium cations per unit cell of the CHA structure after the ion exchange and wherein the mixing further comprises mixing $Na_bAl_bSi_{(36-b)}O_{72}$ with 1M KCl in accordance with reaction equation:

$$Na_bAl_bSi_{(36-b)}O_{72} + aKCl(1M) \rightarrow K_aNa_{(b-a)}Al_bSi_{(36-b)}O_{72} + aNaCl$$

In some embodiments, the mixed cation exchanged chabazite is $KNa_{(b-1)}Al_bSi_{(36-b)}O_{72}$ (1K,NaCHA), $K_2Na_{(b-2)}Al_bSi_{(36-b)}O_{72}$ (2K,NaCHA), $K_3Na_{(b-3)}Al_bSi_{(36-b)}O_{72}$ (3K,NaCHA), $K_4Na_{(b-4)}Al_bSi_{(36-b)}O_{72}$ (4K,NaCHA), or $K_6Na_{(b-6)}Al_bSi_{(36-b)}O_{72}$ (6K,NaCHA). The range of b is dictated by the Si/Al ratios of the compositions of this invention. Therefore, b ranges from 11.25 to 18 and preferably from 12.8 to 15.3 for the compositions of this invention. The number of potassium cations, a, ranges from 1 to 7. Table 1, above, sets out some relevant values for a and b. See Example 2b for methods of making mixed potassium, sodium chabazite compositions.

Alternative Preparation of Mixed Cation CHA Compositions

In some instances, a mixed cation chabazite can be made by mixing a single phase NaCHA composition having a Si/Al ratio of 1 to 2.2, as described above, with an aqueous solution having a 10-fold excess by mole percent of the desired cation type relative to the moles of sodium cations to yield a mixed cation chabazite. The types of cations are those described above. The amount of exchange can be adjusted by repeating the reaction. For example, when the desired mixed cation chabazite is Li,NaCHA, a single phase NaCHA composition having a Si/Al ratio of 1 to 2.2, as described above, is mixed with a single, 10-fold excess, by mole percent, of a 1M aqueous solution of LiCl to yield a Li,NaCHA composition. (See Example 2c.)

EXAMPLES

Exemplary compositions described herein have been characterized in the following manner. In addition to measuring their adsorption properties, novel zeolite compositions were characterized by X-ray diffraction, $^{29}Si$ NMR and by elemental analysis using ICP-OES.

Powder X-ray diffraction (XRD) patterns were generated for the examples using a Rigaku Miniflex X-ray diffractometer. The instrument is equipped with a Toshiba A-20 Cu X-ray tube.

Silicon Nuclear magnetic resonance ($^{29}Si$ NMR) was carried out by Spectral Data Services, Inc. The spectrometer used was a 270 NMR system, operating at an H-1 Larmor frequency of 270.620 MHz, using a 7 mm CPMAS Doty probe. Spectra were obtained using a 45° pulse with an 85 second delay between pulses. The deconvolution of the peaks in the spectra was also done by Spectral Data Services, Inc. From the relative peak areas, the Si/Al ratio was calculated using Equation 1.

$$\frac{Si}{Al} = \frac{\sum_{n=0}^{4} I_{Si_{(nAl)}}}{\sum_{n=0}^{4} 0.25 n I_{Si_{(nAl)}}}$$

where: Si/Al=Silicon to Aluminum ratio, I=Relative area of NMR peak.

$Si_{(nAl)}$=Silicon with n aluminum atoms as nearest neighbor bound through oxygen.

n=Number of nearest aluminum atoms represented by the NMR peak.

The cation exchange level was determined by elemental analysis using established methods, which involved dissolution of the solid and subsequent analysis of the solution using inductively coupled plasma optical emission spectroscopy (ICP-OES).

Example 1: Direct Synthesis of KCHA

TABLE 2

|  | Si/Al | NaY (g) | Al(OH)$_3$ (g) | 4.25M KOH (mL) | H$_2$O (mL) | Time (days) | Nominal Composition | Short Hand |
| --- | --- | --- | --- | --- | --- | --- | --- | --- |
| 1a | 2.0 | 30.4 | 0.231 | 50 | 175 | 8 | $K_{12}Al_{12}Si_{24}O_{72}$ | KCHA (2.0) |
| 1b | 1.85 | 4.99 | 0.360 | 18 | 17 | 8 | $K_{12.6}Al_{12.6}Si_{23.4}O_{72}$ | KCHA (1.85) |
| 1c | 1.6 | 30.0 | 3.24 | 325 | 150 | 2 | $K_{14}Al_{14}Si_{22}O_{72}$ | KCHA (1.6) |
| 1d | 1.35 | 5.00 | 0.720 | 72 | 34 | 8 | $K_{15.3}Al_{15.3}Si_{20.7}O_{72}$ | KCHA (1.35) |

Example compositions 1a through 1d having the Si/Al ratio shown were made in accordance with Table 2 according to the following procedure:

Al(OH)$_3$ and H$_2$O were added to a beaker with a magnetic stir bar and covered with a crystallizing dish; the Al(OH)$_3$ solution was heated to 66° C. and stirred for 15 minutes on a hot plate;

NaY was added to a 250 mL polypropylene jar. The Al(OH)$_3$ solution was added to the jar. Excess solution was washed into the jar with a small amount (~10 ml) of DI water.

KOH was added to the jar.

The jar was shaken vigorously for one minute and sealed.

The jar was placed in the oven at 95° C. for the allotted amount of time.

The resultant samples were characterized by powder XRD, $^{29}$Si NMR and ICP-OES analyses to be essentially pure, single phase chabazites, predominantly in the potassium form, as shown in FIGS. 1-8.

Table 3 below shows the crystallization curve for the gel composition shown above in 1c, designed to give CHA with Si/Al=1.6. The data in the crystallization curve show that the nominally CHA 1.6 composition begins to crystallize in as little as 0.3 day and remains the predominant phase for over 2 weeks under crystallization conditions.

TABLE 3

Crystallization Curve

| Days | CHA Si/Al ratio |
| --- | --- |
| 0.3 | CHA and NaY |
| 1 | 1.6 |
| 2 | 1.71 |
| 4 | 1.59 |
| 6 | 1.63 |
| 9 | 1.67 |
| 13 | 1.69 |
| 15 | 1.71 |
| 17 | 1.14 |

Comparative Example 1: Synthesis of Nominal CHA (1.5) Through Modification of CHA (2.0)

Figure 9:
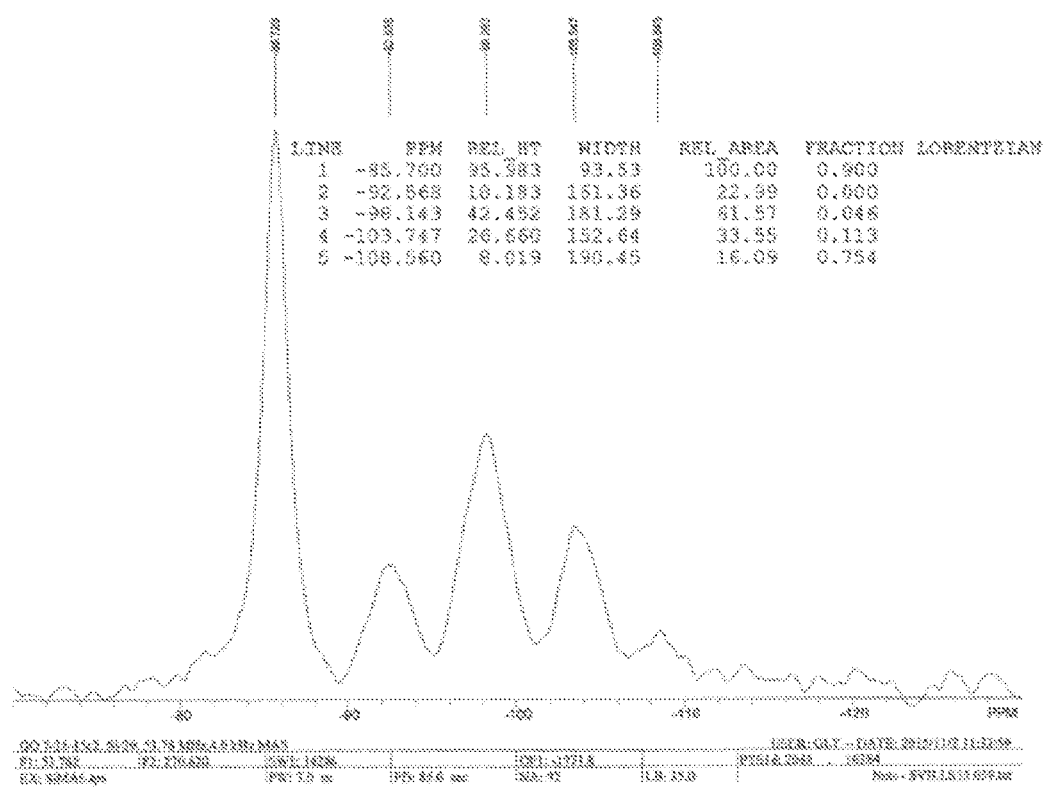
FIG. 9 is an $^{29}$Si NMR spectra for Comparative Example 1: a mixture of chabazites with Si/Al=1 and 2 to give an average Si/Al=1.5 (Mixed NaCHA (1.5))

In this comparative example, the synthesis of CHA (1.5) was attempted starting from CHA (2.0) and crystallizing at 75° C. for 3 days with aluminum hydroxide and sodium hydroxide. This prep is analogous to that described by Kuznicki et al. for CHA (1.5). After filtering and washing with water, the isolated product was dried and analyzed by $^{29}$Si NMR. The NMR spectrum is shown in FIG. 9 and clearly shows evidence of a mixture of CHA (2.0) and CHA (1.0). The spectrum does not show the expected statistical distribution of Si coordinated to 4, 3, 2, and 1 Al atoms observed for the pure CHA (1.6) in FIG. 6. Rather, the trace shows an anomalously large peak for Si coordinated to 4 Al atoms, which is indicative of CHA (1.0) and a smaller statistical distribution of peaks around Si coordinated to 2 Al atoms, indicative of CHA (2.0). The results are similar to those shown by Kuznicki. Gas uptake data for this sample are included vide infra in Tables 4 and 5 and FIGS. 10 and 11. The mixed chabazite adsorbent having two different Si/Al ratios shows a relatively high O$_2$ uptake rate and moderate selectivity, but for all O$_2$, N$_2$, and Ar uptakes this sample shows a very fast unselective region of gas uptake and a slower more selective region of uptake indicative of the 2 separate pore dimensions for the mixed material.

Example 2: Cation Exchange of Potassium Chabazite Materials

As crystallized from their preparation as described in Example 1, the chabazite phases of the chabazites are predominantly in their potassium cation form. Other cation forms, including mixed cation forms, can be prepared, as exemplified in the following examples.

Example 2a: NaCHA

The KCHA form of the chabazite, such as prepared in Example 1, was mixed with a 10-fold excess (mole % basis) of 1M sodium chloride solution at 90° C. for at least 4 hrs. After mixing, the material was filtered. The NaCl mixing (exchange) was repeated 9 times to fully convert the material to a NaCHA. After filtering, the material was rinsed 3 times with a 3-fold excess (wt. % basis) of DI water and was dried overnight at 90° C. The extent of ion exchange was confirmed by inductively coupled plasma optical emission spectroscopy (ICP-OES).

Example 2b: Mixed K,NaCHA

The exchange of NaCHA back to KCHA is very favorable, thermodynamically.

For each K cation substitution desired, a single equivalent of 1 M potassium chloride is exchanged with NaCHA (Na$_b$Al$_b$Si$_{(36-b)}$O$_{72}$) material, such as prepared in Example 2a, at 90° C. for at least 4 hrs. (That is, the ratio of K to Na is a:(b-a), where a represents the moles of K and b represents the initial moles of NaCHA multiplied by the number of sodium cations per unit cell of the CHA composition.) The product is then filtered and rinsed 3 times with a 3-fold excess (wt. %) of DI water, before drying overnight at 90° C. The extent of ion exchange is determined by the stoichiometry of exchange and confirmed by inductively coupled plasma optical emission spectroscopy (ICP-OES) for 3K,NaCHA. Thus, for a $KNa_{(b-1)}Al_bSi_{(36-b)}O_{72}$, 1 equivalent of NaCHA is mixed with 1 equivalent of 1M potassium chloride (KCl), 1 equivalent of Na is replaced by 1 equivalent of K to yield 1 equivalent of $KNa_{(b-1)}Al_bSi_{(36-b)}O_{72}$ (K,NaCHA). For $K_2Na_{(b-2)}Al_bSi_{(36-b)}O_{72}$ (2K,NaCHA), 1 equivalent of NaCHA is mixed with 2 equivalents of KCl to yield $K_2Na_{(b-2)}Al_bSi_{(36-b)}O_{72}$. For $K_3Na_{(b-3)}Al_bSi_{(36-b)}O_{72}$ (3K,NaCHA), 1 equivalent of NaCHA is mixed with 3 equivalents of KCl to yield $K_3Na_{(b-3)}Al_bSi_{(36-b)}O_{72}$. Additional levels of potassium can be similarly obtained. The range of b is dictated by the Si/Al ratios of the compositions of this invention and, so b ranges from 11.25 to 18 and preferably from 12.8 to 15.3 for the compositions of this invention.

Example 2c: Mixed Li,NaCHA

The NaCHA form of the chabazite was exchanged once with a 10-fold excess (mole % basis) of 1M lithium chloride solution at 90° C. for at least 6 hrs. After exchange, the material was filtered. The LiCl exchange was repeated 2 times to partially convert the material to a mixed Li,NaCHA. After filtering, the material was rinsed 3 times with a 3-fold excess (wt. %) of DI water and was dried overnight at 90° C.

Example 3: Adsorption Rate Uptake Measurements

The mass transfer properties of the adsorbents were evaluated using a standard volumetric adsorption apparatus. The experiment consisted of exposing an adsorbent sample, which is initially at vacuum and 30° C., to a measured amount of $O_2$, Na, or Ar at 760 Torr (101 kPa). The change in pressure was then followed as a function of time. A similar pressure history using the same weight of quartz beads in the place of the adsorbent sample is then subtracted from the pressure time data to obtain a plot of the amount of gas adsorbed as a function of time. From the initial slope of the uptake curve, a diffusion parameter for the test gas in units of inverse time ($sec^{-1}$) can be obtained.

A pseudo-equilibrium capacity can be defined for a given adsorbent sample over the timeframe of the experiment as follows. The pressure drop of a gas over an adsorbent sample weighing 2.2 g is measured starting at 760 Torr (101 kPa) until the rate of pressure drop is <1 Torr/min A Pmax defines the total pressure drop or gas uptake over a 2.2 g sample of adsorbent after subtraction of the pressure drop of the glass bead blank. The Pmax together with the system volume, thus defines a pseudo-equilibrium capacity, and these values are given for various adsorbents in Table 5.

The theory behind the derivation of the diffusion parameter is given by the Fickian Diffusion model which is a special case of a more rigorous chemical potential driving force model for adsorbate transport within the adsorbent particle is used. The effect of finite system volume on overall kinetics is also considered. The analytical form of the model is given by:

$$f(t) = 1 - 6 \sum_{n=1}^{\infty} \frac{\exp\left(-\frac{D_c P_n^2 t}{r_c^2}\right)}{\frac{9\gamma}{1-\gamma} + (1-\gamma)P_n^2}$$

Where f(t) is the fractional uptake, $D_c$ is the intra-crystalline diffusivity, $r_c$ is crystal radius (diffusional length scale), t is the time, γ is the fraction of adsorbate ultimately adsorbed by the adsorbent and $P_n$ is the non-zero roots of:

$$\tan P_n = \frac{3P_n}{3 + \left(\frac{1}{\gamma} - 1\right)P_n^2}$$

as set forth in Ruthven, D. M. *Principles of Adsorption and Adsorption Processes*, John Wiley and Sons, New York, 1984.

Kinetic selectivity parameters were measured for the CHA compositions of this invention and compared with other zeolite and carbon molecular sieve (CMS) materials tested internally and from the literature. All of the chabazite samples described herein were activated under vacuum (<10 mPa) at 400° C. for 8 hours to remove water and $CO_2$ prior to adsorption measurements. The results are compiled in Table 4:

TABLE 4

| | Sample | | | | |
|---|---|---|---|---|---|
| Description | $O_2$ $D/r^2$ ($s^{-1}$) | $N_2$ $D/r^2$ ($s^{-1}$) | Ar $D/r^2$ ($s^{-1}$) | $O_2/N_2$ | $O_2/Ar$ |
| CMS pellets | 8.87E−03 | 2.43E−04 | 1.37E−04 | 36.50 | 64.70 |
| 4A powder | 4.86E−01 | 1.91E−02 | 3.03E−02 | 25.40 | 16.00 |
| NaCHA (1.6) | 3.23E−03 | 2.10E−04 | 1.60E−04 | 15.00 | 20.00 |
| NaCHA (1.5): mixture of CHA (1.0 and 2.0) | 6.76E−02 | 2.64E−03 | 2.34E−03 | 26.00 | 29.00 |
| KCHA (1.6) | 1.00E−04 | 1.00E−04 | 1.20E−05 | 1.00 | 8.00 |
| $KNa_{13}Al_{14}Si_{22}O_{72}$ (K, NaCHA (1.6)) | 3.89E−02 | 1.41E−03 | 7.50E−04 | 28.00 | 52.00 |
| $K_2Na_{12}Al_{14}Si_{22}O_{72}$ (2K, NaCHA (1.6)) | 9.33E−02 | 4.27E−03 | 3.67E−03 | 22.00 | 25.00 |
| $K_3Na_{11}Al_{14}Si_{22}O_{72}$ (3K, NaCHA (1.6)) | 1.17E−01 | 2.01E−03 | 1.13E−03 | 58.00 | 104.00 |
| Na, LiCHA (1.6) | 6.04E−02 | 5.33E−03 | 3.88E−03 | 11.00 | 16.00 |
| RS10 | 9.94E−03 | 1.60E−04 | 2.78E−04 | 35.00 | 35.00 |
| Ba-RPZ-3 | 2.43E−03 | | 4.00E−04 | 1.00 | 6.00 |
| $K_6Na_8Al_{14}Si_{22}O_{72}$ (6K, NaCHA (1.6)) | 1.54E−02 | 2.60E−04 | 2.10E−04 | 59.00 | 73.00 |
| $K_4Na_{10}Al_{14}Si_{22}O_{72}$ (3K, NaCHA (1.6)) | 4.26E−02 | 7.70E−04 | 4.00E−04 | 55.00 | 106.00 |
| KCHA (2.0) | 3.70E−04 | 7.20E−04 | 2.30E−04 | 0.50 | 1.50 |
| NaCHA (2.0) | 4.35E−01 | 6.62E−02 | 9.81E−02 | 6.60 | 4.43 |

TABLE 4-continued

| Description | $O_2$ $D/r^2$ $(s^{-1})$ | $N_2$ $D/r^2$ $(s^{-1})$ | Ar $D/r^2$ $(s^{-1})$ | $O_2/N_2$ | $O_2/Ar$ |
|---|---|---|---|---|---|
| $K_4Na_8Al_{12}Si_{24}O_{72}$ (4K, NaCHA (2.0)) | 1.45E−02 | 1.26E−03 | 1.28E−03 | 11.50 | 11.30 |
| $K_3Na_9Al_{12}Si_{24}O_{72}$ (4K, NaCHA (2.0)) | 5.08E−02 | 2.34E−03 | 2.38E−03 | 21.00 | 21.00 |
| NaCHA (1.4) | 6.80E−04 | 3.90E−04 | 4.10E−04 | 1.70 | 1.60 |
| $K_2Na_{13}Al_{15}Si_{21}O_{72}$(2K, NaCHA (1.4)) | 5.89E−03 | 1.46E−03 | | 4.00 | |

Compositions in parentheticals represent the short-hand nomenclature for of the chemical formulas listed previously. Where available, equilibrium data for these same materials is tabulated in Table 5:

bound by theory, it is believed that these mixed compositions create regular pore dimensions which are finely tuned for $O_2$ allowing it to migrate through the pore more rapidly while limiting the rate of $N_2$ and Ar uptake.

TABLE 5

| Description | $O_2$ Pmax (torr) | $O_2$ Capacity* (mmol/g) | $N_2$ Pmax (torr) | $N_2$ Capacity* (mmol/g) | $O_2$ capacity*/ $N_2$ capacity* | Ar Pmax (torr) | Ar Capacity* (mmol/g) | O capacity*/ Ar capacity* |
|---|---|---|---|---|---|---|---|---|
| CMS pellets | 107.3 | 0.222 | 107.2 | 0.221 | 1.00 | | | |
| 4A powder | 41.8 | 0.086 | 113.1 | 0.234 | 0.37 | | | |
| NaCHA (1.6) | 51 | 0.1 | 81 | 0.16 | 0.63 | 21 | 0.041 | 2.40 |
| NaCHA (1.5) mixture | 45 | 0.09 | 107 | 0.21 | 0.43 | 36 | 0.07 | 1.30 |
| KCHA (1.6) | nil | nil | nil | nil | | nil | nil | |
| $KNa_{13}Al_{14}Si_{22}O_{72}$ (K, NaCHA (1.6)) | 72 | 0.14 | 140 | 0.28 | 0.51 | 57 | 0.11 | 1.30 |
| $K_2Na_{12}Al_{14}Si_{22}O_{72}$ (2K, NaCHA (1.6)) | 68 | 0.13 | 136 | 0.26 | 0.50 | 64 | 0.12 | 1.10 |
| $K_3Na_{11}Al_{14}Si_{22}O_{72}$ (3K, NaCHA (1.6)) | 69 | 0.14 | 144 | 0.29 | 0.48 | 68 | 0.13 | 1.00 |
| Na, LiCHA (1.6) | 42 | 0.082 | 109 | 0.22 | 0.39 | 35 | 0.069 | 1.20 |
| RS10 | | | | | | | | |
| Ba-RPZ-3 | | 0.17 | | | | | 0.15 | 1.10 |
| $K_6Na_8Al_{14}Si_{22}O_{72}$ (6K, NaCHA (1.6)) | 59 | 0.11 | 129 | 0.26 | 0.42 | 46 | 0.085 | 1.29 |
| $K_4Na_{10}Al_{14}Si_{22}O_{72}$ (4K, NaCHA (1.6)) | 60 | 0.11 | 120 | 0.24 | 0.46 | 58 | 0.11 | 1.00 |
| KCHA (2.0) | 7.00 | 0.014 | 12 | 0.024 | 0.58 | 2 | 0.004 | 3.50 |
| NaCHA (2.0) | 51.00 | 0.10 | 113 | 0.23 | 0.41 | 49 | 0.1 | 0.95 |
| $K_4Na_8Al_{12}Si_{24}O_{72}$ (4K, NaCHA (2.0)) | 71.00 | 0.14 | 137 | 0.28 | 0.50 | 61 | 0.12 | 1.17 |
| $K_3Na_9Al_{12}Si_{24}O_{72}$ (3K, NaCHA (2.0)) | 77.00 | 0.14 | 156 | 0.28 | 0.50 | 68 | 0.12 | 1.17 |
| NaCHA (1.4) | 44.00 | 0.08 | 32 | 0.06 | 1.30 | 10.00 | 0.02 | 4.40 |
| $K_2Na_{13}Al_{15}Si_{21}O_{72}$ (2K, NaCHA (1.4)) | 27.00 | 0.05 | 34 | 0.06 | 0.83 | | | |

Pmax defines the pressure drop or gas uptake over a 2.2 g sample of adsorbent after subtraction of the pressure drop of the glass bead blank. The Pmax together with the system volume, thus defines a pseudo-equilibrium capacity (*) of a given adsorbent sample over the timeframe of the experiment.

Figure 10:
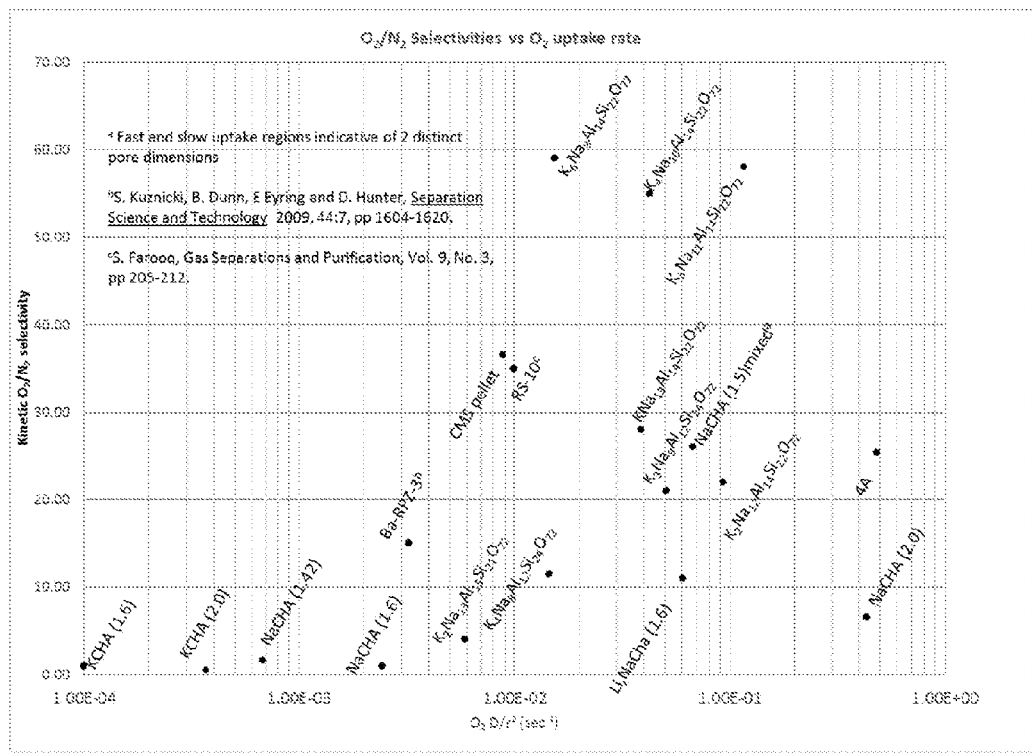
FIG. 10 is a plot of kinetic selectivity of $O_2$ vs. $N_2$ plotted vs. $O_2$ uptake rate for a range of chabazites and literature zeolites.
Figure 11:
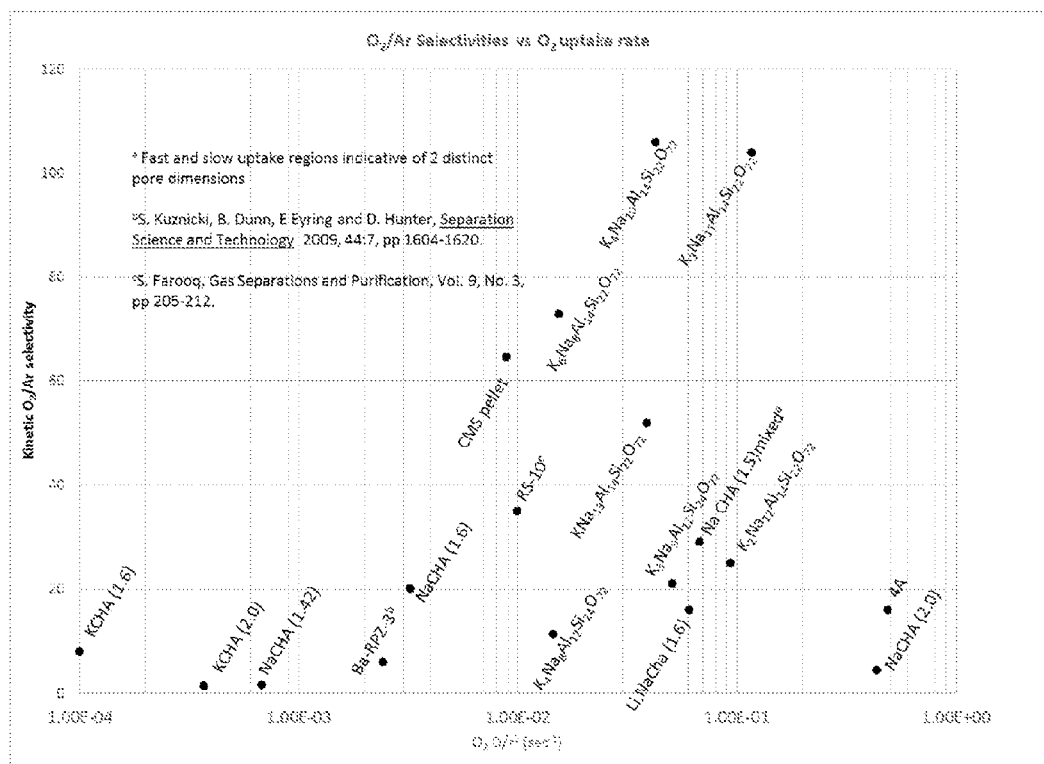
FIG. 11 is a plot of kinetic selectivity of $O_2$ vs. Ar plotted vs. $O_2$ uptake rate for a range of chabazites and literature zeolites.
Figure 12:
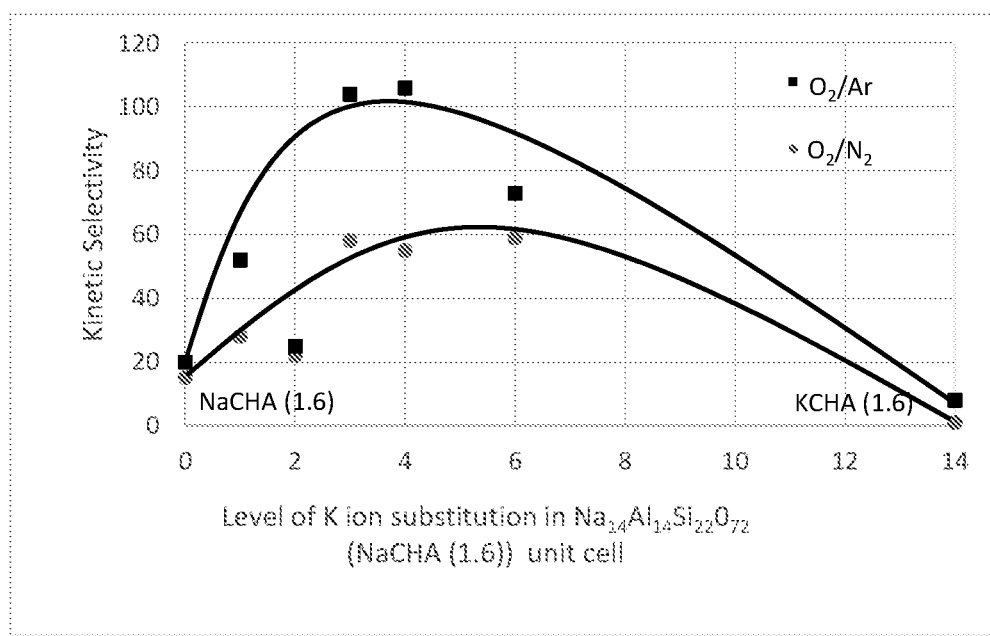
FIG. 12 is a plot of kinetic selectivities of $O_2$ vs. $N_2$ and $O_2$ vs Ar plotted vs. the level of potassium ion exchange in NaCHA (1.6)
Figure 13:
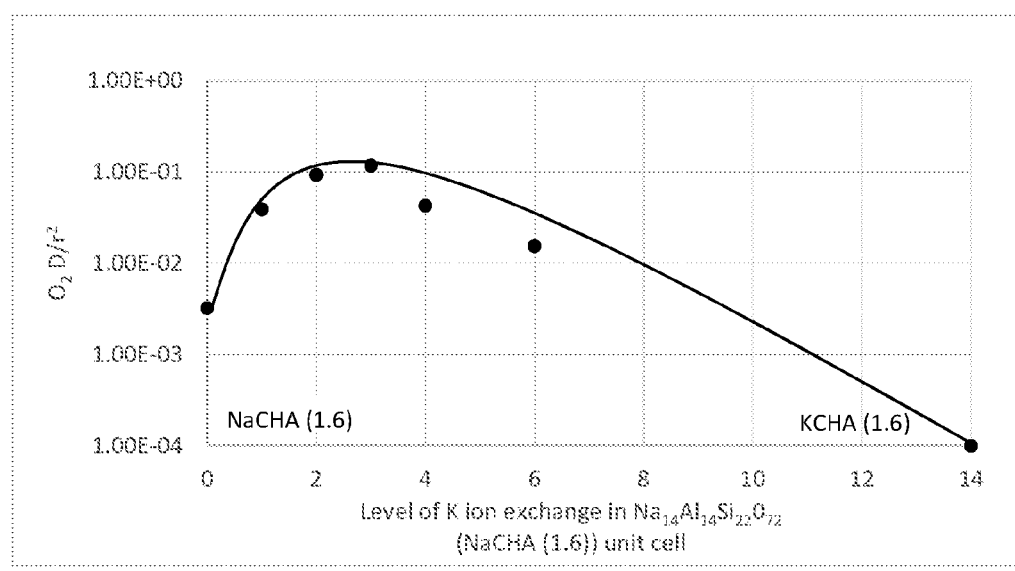
FIG. 13 is a plot of oxygen uptake rate plotted vs. the level of potassium ion exchange in NaCHA (1.6)

The ambient temperature data in Table 5 and FIGS. 9 and 10 show that the homogenous CHA phases with Si/Al~1.6 and containing mixtures of sodium and potassium ions as extra-framework cations are unique among all the materials reported and tested in terms of their high $O_2/N_2$ and $O_2/Ar$ selectivity. The 3K,NaCHA (1.6); 4K,NaCHA (1.6); and 6K,NaCHA (1.6) compositions show the highest kinetic selectivity of any of the tested materials and higher $O_2$ uptake rates than all but the 4A zeolite. In contrast, the single cation NaCHA (1.6) shows much poorer selectivity at an $O_2$ uptake rate, approximately 30 times slower than the 3K,NaCHA (1.6) material. KCHA (1.6) is much slower still and effectively excludes $O_2$, $N_2$, and Ar. This surprising optimization of both kinetic selectivities and oxygen uptake rates is even more clearly seen in FIGS. 12 and 13, where $O_2/Ar$ and $O_2/N_2$ kinetic selectivity and $O_2$ uptake rate are plotted against the potassium exchange level or number of potassium ions in NaCHA (1.6). Again maximum values for kinetic selectivity and rate are observed for the mixed K,NaCHA (1.6) compositions. Without intending to be CMS and other reported zeolites and the MOF Ba-RPZ-3 show poorer selectivities at slower rates, with the exception of 4A zeolite. While 4A zeolite shows very fast $O_2$ uptake, its selectivity for $O_2$ vs. Ar adsorption is much lower than 3K,NaCHA (1.6).

The equilibrium data in Table 5 show that, in addition to higher oxygen uptake rate and kinetic selectivity for $O_2$ over $N_2$ and Ar, the mixed K,NaCHA (1.6) materials have 40% higher $O_2$ capacity at 30° C. than other CHA compositions.

At Si/Al ratios lower than 1.5, for example 1.4, it was observed that at ambient temperatures, $O_2$ uptake rates slow significantly compared for CHA materials with Si/Al>1.5. NaCHA (1.4) showed a very slow $O_2$ uptake rate with similar $N_2$ uptake, while effectively excluding Ar. Incorporation of 2 potassium cations into the unit cell of the NaCHA (1.4) to prepare 2K,NaCHA (1.4) or $K_2Na_{13}Al_{15}Si_{21}O_{72}$ again led to unexpected gas uptake behavior. The overall uptake rates of both $O_2$ and $N_2$ were increased, but, while $N_2$ showed a uniform uptake rate of 0.001 sec$^{-1}$, $O_2$ exhibited two uptake regions: one much faster than that of $N_2$ and a second much slower. The total $O_2$ uptake was approximately equivalent to the $N_2$ uptake. In contrast, the higher Si/Al CHA materials typically adsorb twice as much $N_2$ as $O_2$. While not intended to be bound by theory, the uptake measurements suggest that the addition of two potassium cations to the unit cell leads to new sites in the CHA structure becoming accessible to $O_2$ and not $N_2$, which may help explain why the $O_2$ capacities of 3K,NaCHA (1.6) is also about 30% higher than NaCHA (1.6) at ambient temperatures.

Example 4: Low Temperature Adsorption

Figure 14:
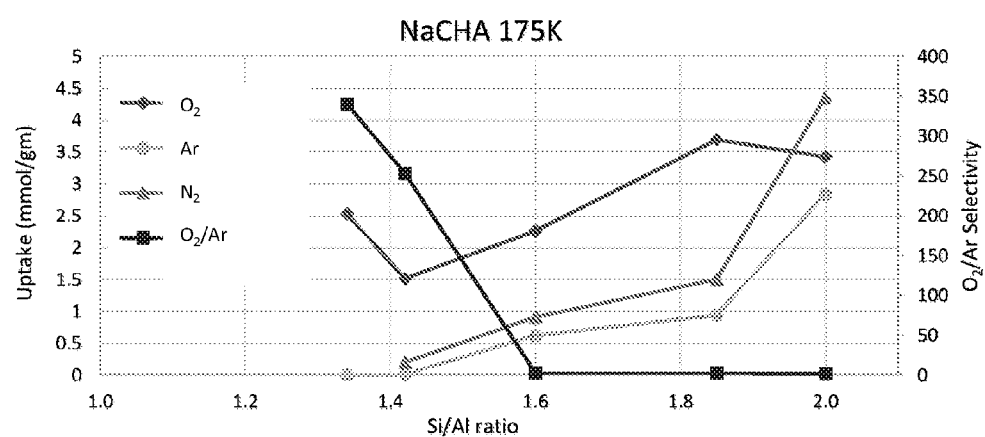
FIG. 14 is a graph depicting the $O_2$, $N_2$, and Ar capacities for NaCHA compositions having varied Si/Al ratios at −98° C.

Low temperature isotherms were measured on the CHA samples with Si/Al in the range of 1.3 to 2 in the sodium form at 175K. A slush bath of methanol and liquid nitrogen was used to obtain 175K for a period of at least 5 hours. Note that 2 or 3 additions of liquid nitrogen were used periodically to keep the temperature constant. The pseudo-equilibrium capacities of each atmospheric gas at 1 atm (101 kPa) on the samples are plotted with respect to the Si/Al ratio in FIG. 14, The $O_2$/Ar selectivity is also plotted in this figure. These gas capacities are considered pseudo-equilibrium because as gas uptake approaches equilibrium, the rate of adsorption becomes slower than the limits of the experiment's duration. The adsorption unit records the pseudo-equilibrium capacities when the sample pressure changes less than 0.01% in 30 seconds. The selectivities in FIG. 14 were calculated by taking the ratio of the pure gas pseudo-equilibrium capacities at 1 atm. In CHA 2.0, adsorption capacities are highest, with $N_2$ having the highest value, followed by $O_2$, and then Ar. When the Si/Al ratio drops to 1.85, this order is switched and $N_2$ no longer adsorbs as strongly as $O_2$ suggesting the partial exclusion of $N_2$. As the Si/Al ratio decreases, the $O_2$/Ar selectivity rises and is largest at Si/Al=1.35. This enhanced selectivity arises because Ar is being more fully excluded from the sample at low Si/Al ratios. Remarkably, the $O_2$ capacity for these samples remains high at 175 K even as Si/Al decreases. It should be noted that all samples are single phase chabazite, synthesized directly from the conversion of Y-type zeolite.

The above examples are illustrative in nature only and are intended to demonstrate the modified chabazite compositions described herein, methods of making them, and their potential use in separating $O_2$ from oxygen containing streams.

Example 5: Argon Production Via Cold Vapor PSA with NaCHA (1.6)

Figure 15:
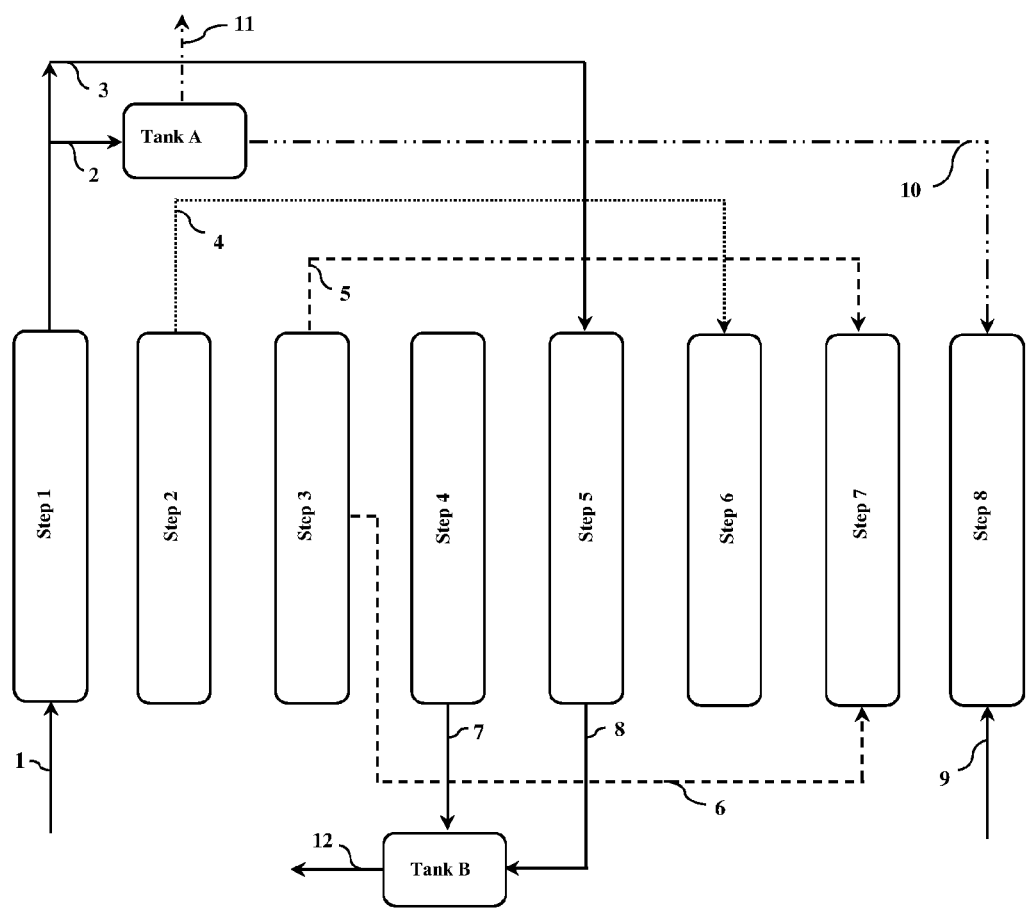
FIG. 15 is a flow chart depicting a PSA cycle used in accordance with some embodiments.
Figure 16:
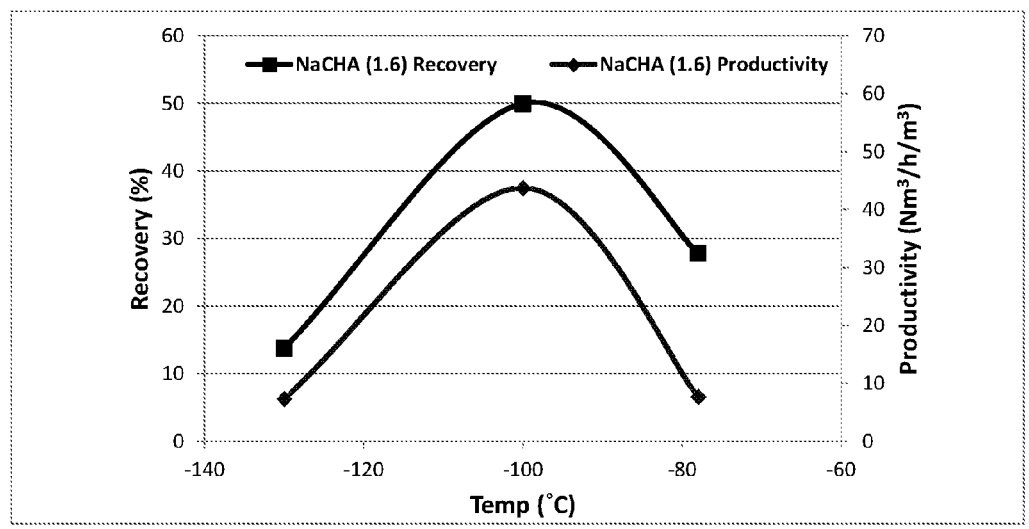
FIG. 16 is a graph depicting the simulated recovery and productivity performance of a sodium chabazite at cold temperatures.

The method and systems described in U.S. patent application Ser. No. 15/049,704 (now U.S. Pat. No. 9,708,188), entitled Method for Argon Production Via Cold Pressure Swing Adsorption (07941), employing a 2-bed, 8-step cold argon PSA process shown in FIG. 15 is used to calculate process performance indicators in the form of primary product (Ar) recovery and productivity using NaCHA (1.6) adsorbent. Each adsorption bed packed with 115.4 kg of adsorbent is 2.44 m long and 0.30 m diameter. The PSA cycle is operated by following the sequence shown in FIG. 15 at a pressure and a temperature of 4.96 bara, and −100° C., respectively. Assuming that the bed has been previously pressurized to the highest pressure level of the cycle with primary product gas (purified Ar), the feed gas mixture containing 94.95 mole % Ar, 5 mole % $O_2$ and remainder $N_2$ is introduced to the inlet end of bed and the un-adsorbed gas (mostly Ar) is discharged from the outlet end of bed. The feed step is continued until the mass transfer zone of preferentially adsorbed component ($O_2$) reaches the exit end of the bed without substantially breaking through it. The flow rate during the feed step (Step 1) is maintained at 32.77 $Nm^3$/h and the effluent gas containing 2.0 ppm $O_2$ at nearly feed pressure and temperature is withdrawn from the product tank (Tank A) as stream 11 (FIG. 15) at a rate of 15.55 $Nm^3$/h. At the termination of the feed step, the bed is connected with the $2^{nd}$ bed undergoing pressure equalization re-pressurization step (Step 6) and a portion of the void as well as desorbed gas is transferred from the product end of the $1^{st}$ bed to the product end of the $2^{nd}$ bed, thus lowering the 1st bed pressure to approximately 4.36 bara at the end of this step (Step 2). Following step 2, a dual end equalization de-pressurization step (Step 3 in FIG. 15) is introduced to transfer more co-adsorbed as well as void gases from the $1^{st}$ bed to the $2^{nd}$ bed from both ends of the bed and therefore, the pressure of the $1^{st}$ bed goes down to approximately 3.12 bara. The dual end re-pressurization can be performed by connecting top ends of the columns and the middle or bottom end of the first bed to the bottom end of the second bed. The column is then counter-currently de-pressurized (Step 4) and thereafter purged (Step 5) counter-currently with primary product gas at 1.32 bara (where the ambient pressure is 1.013 bara). Following the purge step, the column is subsequently pressurized through pressure equalization (Steps 6 and 7) and pressurization (Step 8) steps to bring back the pressure level for initiation and repetition of the aforementioned cycle. With all the steps, the full cycle completes in 550 seconds. The net $O_2$-free (mostly) Argon recovery from the feed gas is 49.97% and the productivity is 43.74 $Nm^3$/h/$m^3$ bed (FIG. 16). This demonstrates that the proposed process can be used to remove $O_2$ from a feed gas at low temperature with a NaCHA (1.6) chabazite. Further removal of Na can be accomplished optionally via distillation or a second layer of adsorbent in the PSA.

Example 6: Argon Production Via Ambient Temperature PSA with 3K,NaCHA (1.6)

The 2-bed, 8-step PSA process discussed above is used for process performance evaluation using 3K,NaCHA (1.6) and CMS at 30° C. For 3K,NaCHA (1.6) the highest and the lowest pressure levels are maintained at approximately 5.07 bara and 1.09 bara, respectively. For CMS, the highest and the lowest pressure levels are maintained at approximately 7.22 bara and 1.15 bara, respectively. The PSA simulation results are shown in Table 4:

| Adsorbent | Argon Recovery % | Productivity $Nm^3$/h/$m^3$ bed |
|---|---|---|
| 3K, NaCHA (1.6) | 32.27 | 67.06 |
| CMS | 31.20 | 30.97 |

The results demonstrate that 3K,NaCHA (1.6) can provide double the productivity of ambient temp CMS Argon PSA, while providing similar recovery. The simulated performance of 3K,NaCHA (1.6) Argon PSA is also achieved at only 5 bara feed pressure, compared with 7.22 bara feed pressure for CMS. This lower feed pressure is achievable in cryogenic distillation plants from static liquid head pressure. 7.22 bara feed pressure requires an additional compressor.

What is claimed is:
1. An adsorbent comprising:
a composition comprising at least 90% chabazite; wherein the chabazite is a single phase chabazite having an Si/Al ratio of 1.2 to 1.8;
the chabazite includes a mixture of at least two types of cations; and
each of the at least two types of cations are in a molar ratio relative to Al of at least 0.12.

2. The adsorbent in accordance with claim 1, wherein the at least two types of cations are selected from Li, Na, Ag, K, Ca, Mg, Zn, Cu, Ba, and Sr ions.

3. The adsorbent in accordance with claim 2, wherein the mixture of the at least two types of cations comprise K and Na ions.

4. The adsorbent in accordance with claim 3, wherein the K and Na cations are in a molar ratio of 0.14 to 1.25 K:Na.

5. The adsorbent in accordance with claim 3, wherein the mixed cation chabazite is aK,NaCHA, wherein a represents the number of potassium cations, and a is from 2 to 7.

6. The adsorbent in accordance with claim 3, wherein the mixed cation chabazite is $K_a Na_{(b-a)}CHA$, where b represents the total number of cations per unit of CHA and is from 12.9 to 16, and a represents the number of potassium cations and is from 2 to 7.

7. The adsorbent composition of claim 3, wherein the mixed cation chabazite is; 2K,NaCHA; 3K,NaCHA; 4K,NaCHA; or 6K,NaCHA.

8. The adsorbent in accordance with claim 1, wherein the chabazite has a Si/Al ratio from 1.35 to 1.6.

9. The adsorbent in accordance with claim 3, wherein the chabazite is selected from 3K,NaCHA (1.6); 4K,NaCHA (1.6); 6K,NaCHA (1.6); and 2K,NaCHA (1.4).

10. The adsorbent in accordance with claim 4, wherein the K and Na cations are in a molar ratio of 0.3 to 0.75 K:Na.

11. The adsorbent in accordance with claim 2, wherein the mixture of the at least two types of cations comprise K and Li ions.

12. The adsorbent in accordance with claim 1, wherein each of the at least two types of cations are in a molar ratio relative to Al of at least 0.18.

13. The adsorbent in accordance with claim 1, wherein each of the at least two types of cations are in a molar ratio relative to Al of at least 0.24.

* * * * *